United States Patent
Tsunematsu et al.

(10) Patent No.: US 11,091,655 B2
(45) Date of Patent: *Aug. 17, 2021

(54) INFRARED-SHIELDING ULTRAFINE PARTICLE DISPERSION BODY, INTERLAYER FOR SHIELDING SOLAR RADIATION, INFRARED-SHIELDING LAMINATED STRUCTURE, AND METHOD FOR PRODUCING NEAR-INFRARED SHIELDING ULTRAFINE PARTICLE DISPERSION BODY

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 16/063,585

(22) PCT Filed: Dec. 19, 2016

(86) PCT No.: PCT/JP2016/087799
§ 371 (c)(1),
(2) Date: Jun. 18, 2018

(87) PCT Pub. No.: WO2017/104854
PCT Pub. Date: Jun. 22, 2017

(65) Prior Publication Data
US 2019/0002708 A1  Jan. 3, 2019

(30) Foreign Application Priority Data

Dec. 18, 2015 (JP) .............................. JP2015-247929
Dec. 18, 2015 (JP) .............................. JP2015-247930
(Continued)

(51) Int. Cl.
*C08K 3/22* (2006.01)
*C09K 3/00* (2006.01)
(Continued)

(52) U.S. Cl.
CPC ............... *C09D 5/32* (2013.01); *C01G 41/00* (2013.01); *C01G 41/006* (2013.01); *C03C 17/32* (2013.01);
(Continued)

(58) Field of Classification Search
CPC ........ C01G 41/00; C01G 41/006; C09D 5/32; C09D 7/61; C09D 201/00; C03C 17/32;
(Continued)

(56) References Cited

U.S. PATENT DOCUMENTS 6,060,154 A  5/2000 Adachi et al.
6,329,061 B2  12/2001 Kondo
(Continued)

FOREIGN PATENT DOCUMENTS

CN 108779000 A  11/2018
EP 2 360 220 A1  8/2011
(Continued)

OTHER PUBLICATIONS

Jan. 24, 2017 International Search Report issued in International Patent Application No. PCT/JP2016/087799.
(Continued)

*Primary Examiner* — Catherine A. Simone
(74) *Attorney, Agent, or Firm* — Oliff PLC

(57) ABSTRACT

There is provided a near-infrared shielding ultrafine particle dispersion body which has transparency in a visible light region, which has good near-infrared shielding properties, in which a blue haze phenomenon is suppressed, and which can be produced with high productivity, namely there is provided a near-infrared shielding ultrafine particle dispersion
(Continued)

body in which ultrafine particles having near-infrared shielding properties are dispersed in a solid medium, wherein the ultrafine particles are composite tungsten oxide ultrafine particles, and a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference.

13 Claims, 2 Drawing Sheets

(30) Foreign Application Priority Data

Jul. 26, 2016 (JP) .............................. JP2016-146803
Jul. 26, 2016 (JP) .............................. JP2016-146805

(51) Int. Cl.
| | |
|---|---|
| *C01G 41/00* | (2006.01) |
| *C09D 5/32* | (2006.01) |
| *C03C 17/32* | (2006.01) |
| *C09D 201/00* | (2006.01) |
| *C08L 101/00* | (2006.01) |
| *C09D 7/61* | (2018.01) |

(52) U.S. Cl.
CPC .............. *C08K 3/22* (2013.01); *C08L 101/00* (2013.01); *C09D 7/61* (2018.01); *C09D 201/00* (2013.01); *C09K 3/00* (2013.01); *C01P 2002/30* (2013.01); *C01P 2002/52* (2013.01); *C01P 2002/54* (2013.01); *C01P 2002/60* (2013.01); *C01P 2002/72* (2013.01); *C01P 2002/74* (2013.01); *C01P 2004/62* (2013.01); *C01P 2004/64* (2013.01); *C01P 2006/12* (2013.01); *C03C 2217/445* (2013.01); *C03C 2217/475* (2013.01); *C03C 2217/74* (2013.01); *C08K 2003/2258* (2013.01); *C08K 2201/005* (2013.01); *Y10T 428/25* (2015.01); *Y10T 428/258* (2015.01)

(58) Field of Classification Search
CPC ........ C03C 2217/445; C03C 2217/475; C03C 2217/74; C08K 3/22; C08K 2003/2258; C08K 2201/005; C08L 101/00; C09K 3/00; C01P 2002/30; C01P 2002/52; C01P 2002/54; C01P 2002/60; C01P 2002/72; C01P 2002/74; C01P 2004/64; C01P 2004/62; C01P 2006/12
See application file for complete search history.

(56) References Cited

U.S. PATENT DOCUMENTS

| | | |
|---|---|---|
| 8,853,314 B2 | 10/2014 | Mamak et al. |
| 10,752,512 B2 * | 8/2020 | Tsunematsu .............. C09K 3/00 |
| 2006/0008640 A1 | 1/2006 | Chonan et al. |
| 2007/0187653 A1 * | 8/2007 | Takeda .................. B82Y 30/00 |
| | | 252/500 |
| 2011/0297899 A1 | 12/2011 | Tofuku |
| 2011/0318578 A1 | 12/2011 | Hashimoto et al. |
| 2012/0129090 A1 | 5/2012 | Mamak et al. |
| 2015/0024211 A1 | 1/2015 | Miratsu et al. |

FOREIGN PATENT DOCUMENTS

| | | |
|---|---|---|
| EP | 2 404 752 A1 | 1/2012 |
| EP | 2 818 519 A1 | 12/2014 |
| JP | H02-136230 A | 5/1990 |
| JP | H08-259279 A | 10/1996 |
| JP | H11-181336 A | 7/1999 |
| JP | 2009-215487 A | 9/2009 |
| JP | 2010-265144 A | 11/2010 |
| JP | 2011-157504 A | 8/2011 |
| JP | 2012-506463 A | 3/2012 |
| JP | 2013-173642 A | 9/2013 |
| JP | 2014-166701 A | 9/2014 |
| JP | 2015-66763 A | 4/2015 |
| WO | 2005/087680 A1 | 9/2005 |
| WO | 2005/037932 A1 | 9/2009 |
| WO | 2016/199682 A1 | 12/2016 |

OTHER PUBLICATIONS

Jul. 8, 2019 Extended European Search Report issued in European Patent Application No. 16875828.2.

* cited by examiner

INFRARED-SHIELDING ULTRAFINE PARTICLE DISPERSION BODY, INTERLAYER FOR SHIELDING SOLAR RADIATION, INFRARED-SHIELDING LAMINATED STRUCTURE, AND METHOD FOR PRODUCING NEAR-INFRARED SHIELDING ULTRAFINE PARTICLE DISPERSION BODY

TECHNICAL FIELD

The present invention relates to a near-infrared shielding ultrafine particle dispersion body such as an infrared shielding glass and an infrared shielding film having good visible light transmittance and having properties of absorbing light in a near infrared region, a solar radiation shielding intermediate film using the near-infrared shielding ultrafine particle dispersion body, an infrared shielding laminated structure and a method for producing the near-infrared shielding ultrafine particle dispersion body.

DESCRIPTION OF RELATED ART

Various techniques have been proposed as a near-infrared shielding technique of lowering solar radiation transmittance while maintaining transparency while having good visible light transmittance and maintaining transparency. Among them, the near-infrared shielding technique using conductive fine particles, which are inorganic substances, has merits such as excellent near-infrared shielding properties, low cost, having radio wave transmittance, and further having high weather resistance compared with other techniques.

For example, patent document 1 discloses a technique applying near-infrared shielding properties of tin oxide fine powder, and discloses a near-infrared shielding synthetic resin molded article formed by molding a transparent resin in which tin oxide fine powder is contained in a dispersed state or a transparent synthetic resin in which tin oxide fine powder is contained in a dispersed state into a sheet or film, and laminating it on a transparent synthetic resin substrate.

Patent document 2 discloses a technique applying the near-infrared shielding properties of metals such as Sn, Ti, Si, Zn, Zr, Fe, Al, Cr, Co, Ce, In, Ni, Ag, Cu, Pt, Mn, Ta, W, V, Mo, oxides of the metals, nitrides of the metals, sulfides of the metals, dopants of Sb or F to the metals, or a mixture thereof, and discloses a laminated glass sandwiching an interlayer in which the above substances are dispersed in a medium.

Further, an applicant discloses in patent document 3 a technique applying the near-infrared shielding properties of titanium nitride fine particles and lanthanum boride fine particles, and discloses a selectively transmittable film coating liquid or a selectively transmittable film in which at least one of these substances is dispersed in a solvent or a medium.

However, according to the study by the applicant, there is a problem that in each case of the near-infrared shielding structure such as the near-infrared shielding synthetic resin molded article disclosed in patent documents 1 to 3, the near-infrared shielding property is not sufficient when high visible light transmittance is required, and a function as the near-infrared shielding structure is not sufficient. For example, as a an example of a specific value of the near-infrared shielding property of the near-infrared shielding structure disclosed in patent documents 1 to 3, a solar radiation transmittance (sometimes referred to simply as "solar radiation transmittance" in the present invention) calculated based on JIS R 3106 exceeds 50%, when a visible light transmittance (sometimes referred to simply as "visible light transmittance" in the present invention) calculated similarly based on JIS R 3106 is 70%.

Therefore, the applicant disclosed in patent document 4 a technique applying composite tungsten oxide fine particles expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \le x/y \le 1$, $2.2 \le z/y \le 3.0$) as near-infrared shielding fine particles, and discloses a method for producing the composite tungsten oxide fine particles and a near-infrared shielding dispersion body containing one or more kinds of composite tungsten oxide fine particles in which the composite tungsten oxide has a hexagonal, tetragonal, or cubic crystal structure, and a particle size of each near-infrared shielding material fine particle is 1 nm or more and 800 nm or less.

As disclosed in patent document 4, the near-infrared shielding fine particle dispersion body containing the composite tungsten oxide fine particles expressed by the general formula $M_xW_yO_z$ exhibits high near-infrared shielding properties, in which the solar radiation transmittance is improved to less than 50% when the visible light transmittance is 70%. Particularly, the near-infrared shielding fine particle dispersion body using composite tungsten oxide fine particles having at least one kind selected from specific elements such as Cs, Rb, Tl as M element and having a hexagonal crystal structure, exhibits excellent near-infrared shielding properties, in which the solar radiation transmittance is improved to less than 37% when the visible light transmittance is 70%. With this achievement, it has been studied to perform a hard coat treatment or the like to the near-infrared shielding fine particle dispersion body and to apply this near-infrared shielding fine particle dispersion body to applications such as a window glass and a plasma display panel.

On the other hand, in these applications, high transparency (low haze value) is required together with near-infrared shielding properties, and therefore attempts have been made to further miniaturize the particle size of the composite tungsten oxide fine particles for the purpose of lowering a haze value, and the haze value can be lowered by miniaturizing the particle size.

However, in the near-infrared shielding fine particle dispersion body in which the composite tungsten oxide fine particles are dispersed, a phenomenon of discoloring to bluish white color (so-called blue haze phenomenon) is confirmed when it is irradiated with sunlight or spotlight, etc. Due to this phenomenon, in a case of using the near-infrared shielding fine particle dispersion body in which the composite tungsten oxide fine particles are used, as a windshield of a vehicle or the like, discoloring to bluish white color occurs under sunlight, resulting in poor visibility, thereby causing concern about safety. Further, in a case of being used as a windowpane, etc., for building materials or the like, the appearance is impaired due to the occurrence of the blue haze phenomenon, and in a case of being used for a plasma display panel or the like, the contrast is largely reduced due to the occurrence of the blue haze phenomenon, thereby causing concern about a generation of a problem of losing vividness and ease of viewing.

Further, the applicant discloses in patent document 5 a near-infrared shielding fine particle dispersion liquid and a near-infrared shielding dispersion body, or the like, with the blue haze phenomenon suppressed, by charging a slurry obtained by mixing the composite tungsten oxide powder produced by the same method as the producing method disclosed in patent document 4, a solvent, and a dispersant into a medium stirring mill together with yttria-stabilized zirconia beads, which is then subjected to pulverization and dispersion treatment until a predetermined particle size is obtained.

However, the composite tungsten oxide produced in patent document 5 has a large particle size of 1 to 5 μm. Accordingly, in order to obtain a near-infrared shielding fine particle dispersion liquid capable of suppressing the blue haze phenomenon, it is necessary to pulverize the composite tungsten oxide for a long time by using a medium stirring mill to finely pulverize the particles. Such a long pulverization process significantly lowers productivity of the near-infrared ray shielding fine particle dispersion liquid.

Therefore, the applicant discloses in patent document 6 the composite tungsten oxide ultrafine particles having a particle size of 100 nm or less produced using a plasma reaction. As a result, by using the composite tungsten oxide ultrafine particles having a small particle size initially as a raw material, there is no necessity for performing a long pulverization treatment, thus making it possible to produce the near-infrared shielding ultrafine particle dispersion liquid with high productivity at a low cost.

On the other hand, there is disclosed in patent document 7 a method for producing composite tungsten oxide fine particles using a plasma reaction.

PRIOR ART DOCUMENT

Patent Document

[Patent Document 1] Japanese Unexamined Patent Publication No. 2-136230
[Patent Document 2] Japanese Unexamined Patent Publication No. 8-259279
[Patent Document 3] Japanese Unexamined Patent Application Publication No. 11-181336
[Patent Document 4] International Publication No. WO 2005/037932
[Patent Document 5] Japanese Unexamined Patent Application Publication No. 2009-215487
[Patent Document 6] Japanese Unexamined Patent Publication No. 2010-265144
[Patent Document 7] Published Japanese Translation No. 2012-506463

SUMMARY OF THE INVENTION

Problem to be Solved by the Invention

However, according to further study by the applicant, the composite tungsten oxide ultrafine particles produced by the method disclosed in patent document 6 have low crystallinity, and therefore the near-infrared shielding properties of the dispersion liquid in which the composite tungsten oxide ultrafine particles are used, are not satisfactory.

Further, the composite tungsten oxide ultrafine particles produced by using the plasma reaction described in patent document 7, contain binary tungsten oxide (namely, a compound having a phase consisting essentially of tungsten and oxygen) and tungsten metal, other than the composite tungsten oxide ultrafine particles. Therefore, the near-infrared shielding properties are not satisfactory.

Under such a circumstance, the present invention is provided, and an object of the present invention is to provide a near-infrared shielding ultrafine particle dispersion body which has transparency in a visible light region, which has good near-infrared shielding properties, in which a blue haze phenomenon is suppressed, and which can be produced with high productivity, a solar radiation shielding intermediate film using the near-infrared shielding ultrafine particle dispersion body, an infrared shielding laminated structure, and a method for producing the near-infrared shielding ultrafine particle dispersion body.

The inventors of the present invention conducted extensive research to achieve the above-described object.

Then, the present inventors found the composite tungsten oxide ultrafine particles having a predetermined value of a peak top intensity ratio in the X-ray diffraction (sometimes referred to as "XRD" hereafter in the present invention) pattern of the composite tungsten oxide ultrafine particles. Specifically, the present inventors found the composite tungsten oxide ultrafine particles having the value of the XRD peak top intensity ratio of 0.13 or more when the value of the XRD peak intensity ratio was set to 1, with plane (220) of a silicon powder standard sample (640c produced by NIST) as a reference.

The composite tungsten oxide ultrafine particles have transparency in a visible light region and have excellent near-infrared shielding properties due to high crystallinity, which are general-purpose composite tungsten oxide ultrafine particles capable of producing a dispersion liquid containing the composite tungsten oxide ultrafine particles with high productivity.

Further, it is also found that the blue haze phenomenon can be suppressed if the dispersed particle size of each composite tungsten oxide ultrafine particles is 200 nm or less in the dispersion liquid in which the composite tungsten oxide ultrafine particles are used.

Then, it is found that by dispersing the composite tungsten oxide ultrafine particles in a solid medium, and providing the solid medium as a coating layer on at least one side of a transparent substrate such as a transparent film substrate or a transparent glass substrate, an infrared shielding glass and an infrared shielding film having transparency in the visible light region and having excellent near infrared shielding properties can be obtained.

It is also found that by dispersing the composite tungsten oxide ultrafine particles in a solid medium and processing it into a sheet shape, a board shape or a film shape, the near-infrared ray shielding ultrafine particle dispersion body in a form of a sheet, a board or a film having transparency in the visible light region and having excellent near-infrared shielding properties can be obtained. Thus, the present invention is completed.

Namely, in order to solve the above-described problem, a first invention is a near-infrared shielding ultrafine particle dispersion body in which ultrafine particles having near-infrared shielding properties are dispersed in a solid medium, wherein the ultrafine particles are composite tungsten oxide ultrafine particles, and a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference.

A second invention is the near-infrared shielding ultrafine particle dispersion body of the first invention, wherein the composite tungsten oxide ultrafine particles are expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.0 \leq z/y \leq 3.0$.

A third invention is the infrared shielding ultrafine particle dispersion body of the first or second invention, wherein each composite tungsten oxide ultrafine particle has a crystallite size of 1 nm or more and 200 nm or less.

A fourth invention is the near-infrared shielding ultrafine particle dispersion body of any one of the first to third inventions, wherein the composite tungsten oxide ultrafine particles contain a hexagonal crystal structure.

A fifth invention is the near-infrared shielding ultrafine particle dispersion body of any one of the first to fourth inventions, wherein a content of a volatile component in the composite tungsten oxide ultrafine particles is 2.5 mass % or less.

A sixth invention is the near-infrared shielding ultrafine particle dispersion body of any one of the first to fifth inventions, wherein the solid medium is a medium resin.

A seventh invention is the near-infrared shielding ultrafine particle dispersion body of the sixth invention, wherein the medium resin is a resin of one kind selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene.vinyl acetate copolymer resin, and polyvinyl acetal resin, or a mixture of two or more resins selected from the above resin group, or a copolymer of two or more resins selected from the above resin group.

An eighth invention is the near-infrared shielding ultrafine particle dispersion body of the sixth invention, wherein the medium resin is a UV curable resin binder.

A ninth invention is the near-infrared shielding ultrafine particle dispersion body of any one of the first to eighth inventions, which contains 0.001 mass % or more and 80 mass % or less of the composite tungsten oxide ultrafine particles.

A tenth invention is the near-infrared shielding ultrafine particle dispersion body of any one of the first to ninth inventions, wherein the near infrared shielding ultrafine particle dispersion body is in a form of a sheet or a board or a film.

An eleventh invention is the near-infrared shielding ultrafine particle dispersion body of any one of the first to tenth inventions, which is provided as a coating layer having a thickness of 1 μm or more and 10 μm or less on a transparent substrate.

A twelfth invention is the near-infrared shielding ultrafine particle dispersion body of the eleventh invention, wherein the transparent substrate is a polyester film.

A thirteenth invention is the near-infrared shielding ultrafine particle dispersion body of the eleventh invention, wherein the transparent substrate is a glass.

A fourteenth invention is a solar radiation shielding intermediate film which constitutes an interlayer sandwiched between two or more transparent substrates in an infrared shielding lamination structure, in which the near-infrared shielding ultrafine particle dispersion body of any one of the first to eleventh inventions is used.

A fifteenth invention is an infrared shielding laminated structure comprising two or more transparent substrates and an interlayer sandwiched between the two or more transparent substrates, wherein the interlayer is composed of one or more intermediate films, at least one layer of the intermediate films is a solar radiation shielding intermediate film of the fourteenth invention, and the transparent substrate is any one selected from a sheet glass, a plastic, and a plastic containing fine particles having a solar radiation shielding function.

A sixteenth invention is a method for producing a near-infrared shielding ultrafine particle dispersion body in which ultrafine particles having near infrared shielding properties are dispersed in a solid medium, wherein composite tungsten oxide ultrafine particles are dispersed in the solid medium as ultrafine particles having the near-infrared shielding properties in which a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference.

A seventeenth invention is the method for producing a near-infrared shielding ultrafine particle dispersion body of the sixteenth invention, wherein the composite tungsten oxide ultrafine particles are composite tungsten oxide ultrafine particles expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.0 \leq z/y \leq 3.0$.

An eighteenth invention is the method for producing the near-infrared shielding ultrafine particle dispersion body of the sixteenth or seventeenth invention, wherein a dispersed particle size of each composite tungsten oxide ultrafine particle is 1 nm or more and 200 nm or less.

A nineteenth invention is the method for producing the near-infrared shielding ultrafine particle dispersion body of any one of the sixteenth to eighteenth inventions, wherein the composite tungsten oxide ultrafine particles contain a hexagonal crystal structure.

A twentieth invention is the method for producing the near-infrared shielding ultrafine particle dispersion body of any one of the sixteenth to nineteenth inventions, wherein a content of a volatile component of the composite tungsten oxide ultrafine particles is 2.5 mass % or less.

Advantage of the Invention

According to the present invention, it is possible to obtain a near-infrared shielding ultrafine particle dispersion body which has transparency in a visible light region, which has excellent infrared shielding properties, in which a blue haze phenomenon is suppressed, and which can be produced with high productivity.

DETAILED DESCRIPTION OF THE INVENTION

Embodiments of the Invention

Figure 1:
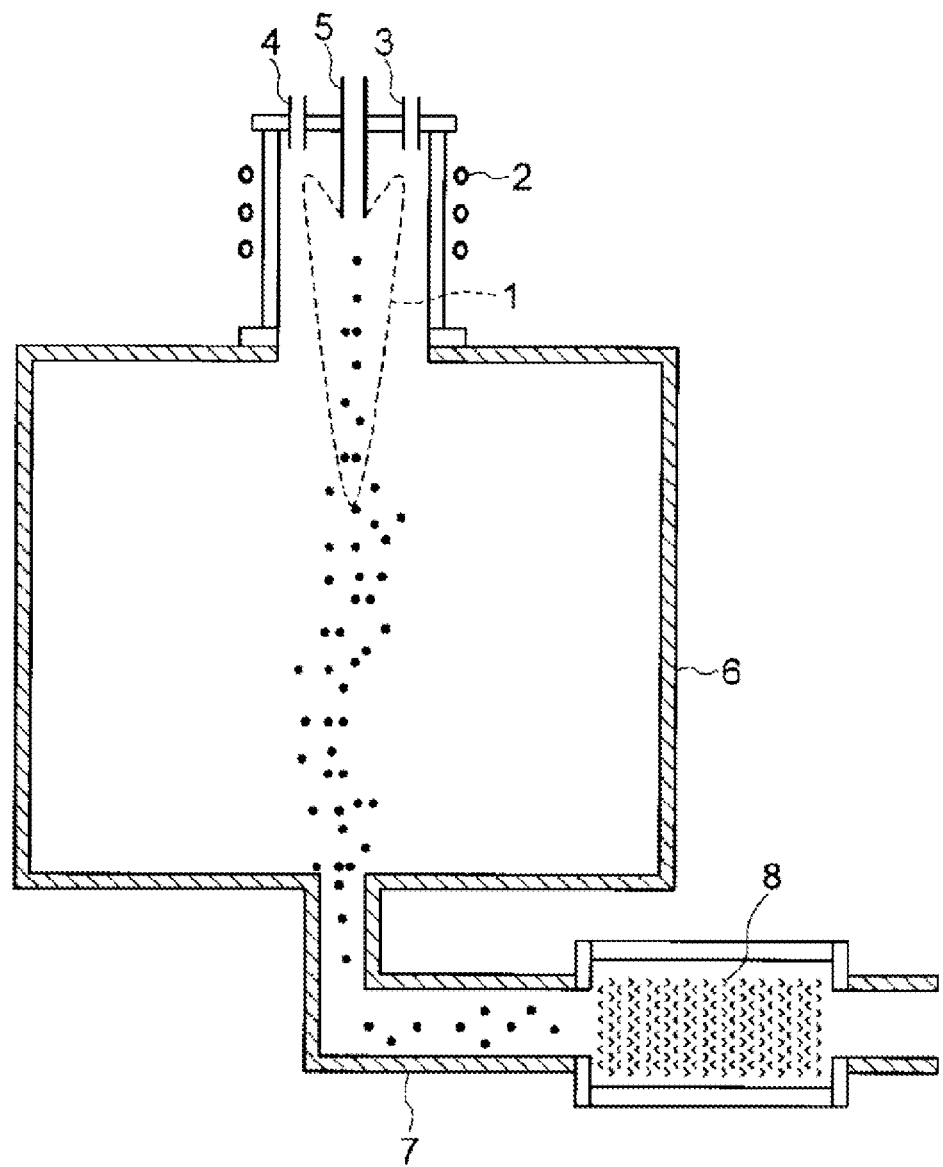
FIG. 1 is a conceptual diagram of a high-frequency plasma reaction device used in the present invention.

Embodiments of the present invention will be described hereafter in an order of [a] Composite tungsten oxide ultrafine particles, [b] Method for synthesizing the composite tungsten oxide ultrafine particles, [c] Volatile component of the composite tungsten oxide ultrafine particles and its drying treatment method, and [d] Composite tungsten oxide ultrafine particle dispersion liquid, [e] Near-infrared shielding ultrafine particle dispersion body, [f] Near-infrared shielding ultrafine particle dispersion body in a form of a sheet, a board or a film, which is an example of the near-infrared shielding ultrafine particle dispersion body, [g] Infrared shielding film, infrared shielding glass which are examples of the near infrared shielding ultrafine particle dispersion body, and [h] infrared shielding laminated structure.

[a] Composite Tungsten Oxide Ultrafine Particles

The composite tungsten oxide ultrafine particles of the present invention will be described in an order of (1) XRD peak top intensity ratio, (2) Composition, (3) Crystal structure, (4) BET specific surface area, (5) Dispersed particle size, (6) Volatile component, (7) Conclusion.

(1) XRD Peak Top Intensity Ratio

The composite tungsten oxide ultrafine particles of the present invention have near-infrared shielding properties, in which a value of the XRD peak top intensity ratio is 0.13 or more when a value of an XRD peak intensity ratio is set to 1, with plane (220) of a silicon powder standard sample (640 c produced by NIST) as a reference.

For measuring the XRD peak top intensity of the above-described composite tungsten oxide ultrafine particles, a powder X-ray diffraction method is used. At this time, to make measurement results objectively quantitative among samples of the composite tungsten oxide ultrafine particles, a standard sample is defined, and the peak intensity of the standard sample is measured, the value of the XRD peak top intensity ratio of the ultrafine particle sample to the value of the peak intensity of the standard sample is expressed as the XRD peak top intensity of each ultrafine particle sample.

Here, as the standard sample, a silicon powder standard sample (NIST, 640 c) having universality in this industry is used, and plane (220) in the silicon powder standard sample not overlapping with the XRD peak of the composite tungsten oxide ultrafine particles is taken as a reference.

Further, in order to ensure objective quantification, other measurement conditions are always set to be constant.

First, a sample holder with a depth of 1.0 mm is filled with the ultrafine particle sample by a known operation in X-ray diffraction measurement. Specifically, in order to avoid a preferential orientation (crystal orientation) in the ultrafine particle sample, it is preferable to fill it randomly and gradually, and fill it as densely as possible without unevenness.

As an X-ray source, an X-ray tube having Cu as an anode target material is used in an output setting of 45 kV/40 mA, and measurement is performed by powder X-ray diffraction method of θ-2θ in step scan mode (step size: 0.0165° (2θ) and counting time: 0.022 sec/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most ½₀ or less of a predicted lifetime of the X-ray tube. As a more preferable measurement method, there is a method for calculating the XRD peak intensity ratio by performing measurement of the silicon powder standard sample every time the X-ray diffraction pattern of the composite tungsten oxide ultrafine particles is measured. Such a measurement method is used in the present invention. The X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small.

Further, in order to keep the temperature of the X-ray tube constant, it is preferable to keep a cooling water temperature for the X-ray tube constant.

The XRD peak top intensity of the composite tungsten oxide ultrafine particles is closely related to the crystallinity of the ultrafine particles, and further it is closely related to a free electron density in the ultrafine particles. It is found by the present inventors that the XRD peak top intensity greatly affects the near-infrared shielding properties of the composite tungsten oxide ultrafine particles. Specifically, it is found that when the value of the XRD peak top intensity ratio is 0.13 or more, a free electron density in the ultrafine particles is ensured and desired near-infrared shielding properties can be obtained. Note that the value of the XRD peak top intensity ratio may be 0.13 or more, and preferably 0.7 or less.

Note that the XRD peak top intensity is the peak intensity at 2θ where the peak count is highest in the X-ray diffraction pattern. Then, in hexagonal Cs composite tungsten oxide and Rb composite tungsten oxide, the peak count 2θ in the X-ray diffraction pattern appears in a range of 25° to 31°.

The XRD peak top intensity of the composite tungsten oxide ultrafine particles will also be described from a different viewpoint.

When the value of the XRD peak top intensity ratio of the composite tungsten oxide ultrafine particle is 0.13 or more, this means that the composite tungsten oxide ultrafine particles with good crystallinity containing almost no hetero phase are obtained. Namely, it is considered that the obtained composite tungsten oxide ultrafine particles are not amorphous. As a result, it is considered that by dispersing the composite tungsten oxide ultrafine particles containing almost no such hetero phase in a liquid medium such as an organic solvent that transmits visible light, or a solid medium such as resin that transmits visible light, the near-infrared shielding properties are sufficiently obtained.

In the present invention, "hetero phase" means a phase of a compound other than the composite tungsten oxide. Further, by analyzing the X-ray diffraction pattern obtained when measuring the XRD peak top intensity, the crystal structure and the crystallite size of each composite tungsten oxide fine particle can be obtained.

(2) Composition

The composite tungsten oxide ultrafine particles of the present invention are preferably the composite tungsten oxide ultrafine particles expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.0 \leq z/y \leq 3.0$.

The composite tungsten oxide ultrafine particles expressed by the general formula $M_xW_yO_z$ will be described.

The M element, x, y, z and a crystal structure thereof in the general formula $M_xW_yO_z$, are closely related to the free electron density of the composite tungsten oxide ultrafine particles, and greatly affect the infrared shielding properties.

Generally, there is no effective free electron in tungsten trioxide ($WO_3$), and therefore the near-infrared shielding properties are low.

Here, it is found by the present inventors that by obtaining the composite tungsten oxide by adding an element of one or more kinds selected from M element (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb) to the tungsten oxide, free electrons are generated in the composite tungsten oxide, absorption properties derived from the free electrons are developed in the near-infrared region. Then the composite tungsten oxide becomes effective as a near-infrared shielding material in the vicinity of a wavelength of 1000 nm, and is maintained in a chemically stable state, and becomes effective as a near-infrared shielding material excellent in weather resistance. Further, M element is preferably Cs, Rb, K, Tl, Ba, Cu, Al, Mn, and In. Among them, when the M element is Cs or Rb, the composite tungsten oxide can easily take a hexagonal crystal structure, and since the composite tungsten oxide transmits visible light and absorbs and shields near-infrared rays, it is also found to be particularly preferable for the reason described later.

Here, the knowledge of the present inventors on the value of x indicating an addition amount of the M element will be described.

When the value of x/y is 0.001 or more, a sufficient amount of free electrons is generated and a desired near-infrared shielding property can be obtained. Then, as the addition amount of the M element is increased, a feed amount of the free electrons is increased and the near-infrared shielding property is also increased, but when the value of x/y is about 1, the effect is saturated. Further, when the value of x/y is 1 or less, generation of an impurity phase in the composite tungsten ultrafine particles can be avoided, which is preferable.

Next, the knowledge of the present inventors on the value of z indicating control of oxygen content will be described.

In the composite tungsten oxide ultrafine particle expressed by the general formula $M_xW_yO_z$, the value of z/y is preferably $2.0 < z/y \leq 3.0$, more preferably, $2.2 \leq z/y \leq 3.0$, further more preferably $2.6 \leq z/y \leq 3.0$, and most preferably $2.7 \leq z/y \leq 3.0$. This is because when the value of z/y is 2.0 or more, it is possible to avoid an appearance of a crystal phase of $WO_2$ which is a compound not desired in the composite tungsten oxide, and chemical stability as a material can be obtained, and therefore it is possible to be applied as an effective infrared shielding material. In contrast, when the value of z/y is 3.0 or less, a required amount of free electrons is generated in the tungsten oxide and it is possible to be used as an efficient infrared shielding material.

(3) Crystal Structure

The composite tungsten oxide ultrafine particles take a tetragonal or cubic tungsten bronze structure other than the hexagonal crystal structure. Therefore, it is effective as an infrared shielding material even when adopting any crystal structure. However, an absorption position in the near-infrared region is likely to change depending on the crystal structure taken by the composite tungsten oxide ultrafine particles. Namely, the absorption position in the near-infrared region is shifted to a longer wavelength side in a case of the tetragonal crystal structure than the cubic crystal structure, and the absorption position is likely to be shifted to a further longer wavelength side in a case of the hexagonal crystal structure than the tetragonal crystal structure. Further, in conjunction with a fluctuation of the absorption position, absorption in the visible light region is smallest in an order of the hexagonal crystal structure, the tetragonal crystal structure, and the cubic crystal structure in which absorption is largest among them.

From the above-described knowledge, for applications in which light in the visible light region is more transmitted and light in the infrared region is more shielded, it is preferable to use the hexagonal tungsten bronze. When each composite tungsten oxide ultrafine particles has a hexagonal crystal structure, transmittance of the fine particles in the visible light region is improved and absorption in the near-infrared region is improved.

Namely, in the composite tungsten oxide, when the value of the XRD peak top intensity ratio satisfies a predetermined value and in a case of the hexagonal tungsten bronze, excellent optical properties are exhibited. Further, even when each composite tungsten oxide ultrafine particle has a monoclinic crystal structure similar to $WO_{2.72}$ called a Magneli phase, or an orthorhombic crystal structure, it is excellent in infrared absorption, and it is effective as a near-infrared shielding material in some cases.

From the above-described knowledge, when the composite tungsten oxide ultrafine particle having a hexagonal crystal structure has a uniform crystal structure, the addition amount of the M element is expressed by the value of x/y which is preferably 0.2 or more and 0.5 or less, and is more preferably $0.29 \leq x/y \leq 0.39$. Theoretically, when satisfying z/y=3, the value of x/y is 0.33. Thereby, it is considered that added M elements are arranged in all hexagonal voids.

Further, in the composite tungsten oxide ultrafine particles, it is preferable to be a single crystal having 50% or more volume ratio, or in other words, it is preferable to be a single crystal having less than 50% volume ratio of an amorphous phase.

When the composite tungsten oxide ultrafine particle is a single crystal having less than 50% volume ratio of the amorphous phase, it is possible to set the crystallite size to 200 nm or less while maintaining the XRD peak top intensity. By setting the crystallite size of the composite tungsten oxide ultrafine particles to 200 nm or less, a dispersed particle size thereof can be set to 1 nm or more and 200 nm or less.

In contrast, although the dispersed particle size is 1 nm or more and 200 nm or less in the composite tungsten ultrafine particles, in a case that the amorphous phase is present in a volume ratio of more than 50% or in a case of polycrystal, the value of the XRD peak top intensity ratio of the composite tungsten ultrafine particle is less than 0.13, and as a result, the near-infrared ray absorbing properties are insufficient and the near-infrared shielding properties are insufficient in some cases.

Then, it is more preferable that the crystallite size of the composite tungsten oxide ultrafine particle is 200 nm or less and 10 nm or more. This is because when the crystallite size is in a range of 200 nm or less and 10 nm or more, the value of the XRD peak top intensity ratio exceeds 0.13, and further excellent infrared shielding properties are exhibited.

Note that the X-ray diffraction pattern of the composite tungsten oxide ultrafine particles in the composite tungsten oxide ultrafine particle dispersion liquid after being disintegrated, pulverized or dispersed described later, is maintained in the X-ray diffraction pattern of the composite tungsten oxide ultrafine particles contained in the near-infrared shielding ultrafine particle dispersion body or the solar radiation shielding laminated structure.

As a result, the effect of the present invention is exhibited as long as a crystal state such as the XRD pattern, the XRD peak top intensity, and the crystallite size of the composite tungsten oxide ultrafine particles contained in the near-infrared shielding ultrafine particle dispersion body, is in a crystal state of the composite tungsten oxide ultrafine particles that can be used in the present invention.

Note that it is possible to confirm that the composite tungsten oxide ultrafine particles are single crystals, because grain boundaries are not observed in each fine particle, but only uniform lattice fringes are observed in an electron microscope image obtained by a transmission electron microscope or the like. It is also confirmed that the volume ratio of the amorphous phase is less than 50% in the composite tungsten oxide ultrafine particles, because uniform lattice stripes are observed throughout the particle, and almost no places of unclear lattice stripes are observed similarly in the transmission electron microscope image. The amorphous phase is present in an outer circumferential part of the particle in many cases, and therefore by paying attention to the outer circumferential part of the particle, the volume ratio of the amorphous phase can be calculated in many cases. For example, when the amorphous phase whose lattice stripes are unclear is present in a layered manner on the particle outer circumferential part of a spherical composite tungsten oxide ultrafine particle, and when a thickness of the layer is 20% or less of the particle size of the composite tungsten oxide ultrafine particle, the volume ratio of the amorphous phase in the composite tungsten oxide ultrafine particles is less than 50%.

On the other hand, when the composite tungsten oxide ultrafine particles are dispersed in a coating layer constituting the composite tungsten oxide ultrafine particle dispersion body, or in a layer obtained by applying a predetermined treatment to the coating layer to cure the resin of the coating layer (Sometimes referred to as "a cured layer" in the present invention), and when a value of a difference obtained by subtracting the crystallite size from an average particle size of the dispersed composite tungsten oxide ultrafine particles is 20% or less of the average particle size, it can be said that the composite tungsten oxide ultrafine particle is a single crystal in which the volume ratio of an amorphous phase is less than 50%.

Here, the average particle size of the composite tungsten oxide ultrafine particles can be obtained by measuring the particle size of 100 composite tungsten oxide ultrafine particles using an image processing device, from a transmission electron microscopic image of the composite tungsten oxide ultrafine particle dispersion body, and calculating the average value thereof. Then, a synthesis step, a pulverization step and a dispersion step of the composite tungsten oxide ultrafine particles may be appropriately adjusted according to a production facility, so that a difference between the average particle size and the crystallite size of the composite tungsten oxide ultrafine particles dispersed in the composite tungsten oxide ultrafine particle dispersion body is 20% or less.

(4) BET Specific Surface Area

The BET specific surface area of the composite tungsten oxide ultrafine particles of the present invention is, closely related to the particle size distribution of the ultrafine particles, but simultaneously greatly affects a production cost and productivity of near-infrared shielding dispersion liquid using the ultrafine particles as a raw material, and infrared shielding properties of the ultrafine particles themselves and light resistance to suppress light coloring.

A small BET specific surface area of the ultrafine particles indicates that the crystallite size of each ultrafine particle is large. Therefore, when the BET specific surface area of the ultrafine particle is not less than a predetermined value, it is not necessary to pulverize the ultrafine particles by a medium stirring mill for a long time to make finer particles in order to produce the near-infrared shielding dispersion liquid having transparency in the visible light region and capable of suppressing the above-described blue haze phenomenon, and reduction of the production cost and improvement of the productivity of the near infrared shielding dispersion liquid can be realized.

On the other hand, the fact that the BET specific surface area of the ultrafine particle is a predetermined value or less, for example, 200 $m^2/g$ or less, indicates that the BET particle size becomes 2 nm or more when assuming that a particle shape is a true spherical shape, and means that there are almost no ultrafine particles having a crystallite size of 1 nm or less which do not contribute to the near infrared shielding property. Therefore, when the BET specific surface area of the ultrafine particles is not more than a predetermined value, near-infrared shielding properties and light resistance of the ultrafine particles are ensured.

However, in addition to the fact that the BET specific surface area of the ultrafine particles is 200 $m^2/g$ or less, when the above-described value of the XRD peak top intensity is a predetermined value or more, there are almost no ultrafine particles having a crystallite size of 1 nm or less which do not contribute to the near infrared shielding properties, and ultrafine particles with good crystallinity are present, and therefore it can be considered that the near-infrared shielding properties and the light resistance of the ultrafine particles are ensured.

For the measurement of the BET specific surface area of the composite tungsten oxide ultrafine particles described above, nitrogen gas, argon gas, krypton gas, xenon gas and the like are used as the gas used for adsorption. However, when a measurement sample is powder and a specific surface area is 0.1 $m^2/g$ or more like the composite tungsten oxide ultrafine particles of the present invention, it is preferable to use nitrogen gas which is comparatively easy to handle and low cost. The BET specific surface area of the composite tungsten oxide ultrafine particles is preferably 30.0 $m^2/g$ or more and 120.0 $m^2/g$ or less, more preferably 30.0 $m^2/g$ or more and 90.0 $m^2/g$ or less, further more preferably 35.0 $m^2/g$ or more and 70.0 $m^2/g$ or less. It is preferable that the BET specific surface area of the composite tungsten oxide ultrafine particles is the above-described value even before and after pulverization and dispersion for obtaining the composite tungsten oxide ultrafine particle dispersion liquid.

(5) Dispersed Particle Size

The dispersed particle size of each composite tungsten oxide ultrafine particles is preferably 200 nm or less, and more preferably the dispersed particle size is 200 nm or less and 10 nm or more. It is preferable that the dispersed particle size of the composite tungsten oxide ultrafine particles is 200 nm or less, and the same is true for the composite tungsten oxide ultrafine particles in the composite tungsten oxide ultrafine particle dispersion liquid, because it is preferable that the crystallite size of each composite tungsten oxide ultrafine particle is 200 nm or less at largest. On the other hand, from a viewpoint of the near-infrared absorption properties of the composite tungsten oxide ultrafine particles, the crystal particle size is preferably 1 nm or more, and more preferably 10 nm or more.

(6) Volatile Component

The composite tungsten oxide ultrafine particles of the present invention contain a component volatilized by heating (sometimes described as "volatile component" in the present invention) in some cases. The volatile component derives from a substance that is adsorbed when the composite tungsten oxide ultrafine particle is exposed to a storage atmosphere or the air atmosphere or during a synthesis process. Here, specific examples of the volatile component include a case of water, or a case of the solvent of the dispersion liquid described later. For example, the volatile component is a component that volatilizes from the composite tungsten oxide ultrafine particles by heating at 150° C. or less.

As described above, the volatile component and its content in the composite tungsten oxide ultrafine particles are related to an amount of moisture adsorbed when the ultrafine particles are exposed to the atmosphere or the like and a residual amount of the solvent in the drying step of the ultrafine particles. Then, the volatile component and its content may greatly affect dispersibility in some cases, when the ultrafine particles are dispersed in the resin (medium resin) or the like.

For example, when compatibility is poor between the resin used for a near infrared shielding dispersion body described later and the volatile component adsorbed on the ultrafine particle, and further when the content of the volatile component is high in the ultrafine particle, there is a case of causing haze generation (deterioration of transparency) of the produced near infrared shielding dispersion body. Further, when the produced near-infrared shielding dispersion body is installed outdoors for a long time and exposed to sunlight or weather, there is a case that the composite tungsten oxide ultrafine particles are desorbed from the near-infrared shielding dispersion body or peeling of the film occurs. This is because the poor compatibility between the ultrafine particles and the resin causes deterioration of the produced near-infrared shielding dispersion body. This means that in the composite tungsten oxide ultrafine particles containing a predetermined amount or less of volatile components, whether or not there is a satisfactory dispersion of the ultrafine particles is not affected by the compatibility with a dispersion medium used in a dispersion system. Accordingly, in the composite tungsten oxide ultrafine particles of the present invention, when the content of the volatile component is a predetermined amount or less, versatility is exhibited.

According to the study by the present inventors, it is found that when the content of the volatile component is 2.5 mass % or less in the composite tungsten oxide ultrafine particles, the ultrafine particles can be dispersed in a dispersion medium used for any one of the dispersion systems, and such composite tungsten oxide ultrafine particles become the general-purpose composite tungsten oxide ultrafine particles.

On the other hand, it is also found that a lower limit of a content ratio of the volatile component is not particularly limited.

As a result, when the ultrafine particles having the volatile component content of 2.5 mass % or less are not excessively secondary aggregated, the ultrafine particles can be dispersed in resin or the like, by uniformly mixing and kneading (including melt mixing) by a mixing machine such as a tumbler, a Nauta mixer, a Henschel mixer, a super mixer, a planetary mixer, and a kneading machine such as a Banbury mixer, a kneader, a roll, a single screw extruder, and a twin screw extruder.

The content of the volatile component in the composite tungsten oxide ultrafine particles can be measured by thermal analysis. Specifically, a weight reduction of a composite tungsten oxide ultrafine particle sample may be measured by holding the composite tungsten oxide ultrafine particle sample at a temperature lower than a temperature at which the composite tungsten oxide ultrafine particle is thermally decomposed and higher than a temperature at which the volatile component is volatilized. Further, when the volatile component is specified, gas mass spectrometry may be used together, to analyze the volatile component.

(7) Conclusion

As described above, the value of the XRD peak top intensity and the BET specific surface area of the composite tungsten oxide ultrafine particles can be controlled by predetermined production conditions, and specifically can be controlled by a suitable setting of the production conditions such as a temperature (firing temperature), a generation time (firing time), a generation atmosphere (firing atmosphere), a form of a precursor raw material, an annealing treatment after generation, doping of an impurity element, and the like, for producing the ultrafine particles by the thermal plasma method or the solid-phase reaction method.

On the other hand, the content of the volatile component of the composite tungsten oxide ultrafine particles can be controlled by a suitable setting of the production conditions such as a preservation method and a storage atmosphere of the ultrafine particles, a temperature at which the ultrafine particles dispersion liquid is dried, a drying time, and a drying method, and the like. Note that the content of the volatile component of the composite tungsten oxide ultrafine particles does not depend on the crystal structure of the composite tungsten oxide ultrafine particles or the synthetic method of the composite tungsten oxide ultrafine particles, such as the thermal plasma method or the solid-phase reaction method described later.

[b] Method for Synthesizing the Composite Tungsten Oxide Ultrafine Particles

A method for synthesizing the composite tungsten oxide ultrafine particles of the present invention will be described.

The method for synthesizing the composite tungsten oxide ultrafine particles of the present invention, includes the thermal plasma method for charging a tungsten compound starting material into a thermal plasma, and the solid-phase reaction method for performing heat treatment to the tungsten compound starting material in a reducing gas atmosphere. The composite tungsten oxide ultrafine particles synthesized by the thermal plasma method or the solid-phase reaction method are subjected to dispersion treatment or pulverization and dispersion treatment.

Explanation will be given hereafter in the order of (1) Thermal plasma method, (2) Solid-phase reaction method, and (3) Synthesized composite tungsten oxide ultrafine particles.

(1) Thermal Plasma Method

Explanation will be given for the thermal plasma method in the order of (i) Material used for the thermal plasma method, (ii) Thermal plasma method and its conditions.

(i) Raw Material Used for the Thermal Plasma Method

When synthesizing the composite tungsten oxide ultrafine particles of the present invention by the thermal plasma method, a mixed powder of the tungsten compound and the M element compound can be used as a raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$ (wherein M is the M element, W is tungsten, O is oxygen, satisfying $0.001 \leq x/y \leq 1.0$, $2.0 < z/y \leq 3.0$). Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the ultrafine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic field (frequency 4 MHz). At this time, high-frequency power is set to 30 to 40 kW.

Further, the mixed powder of the M element compound and the tungsten compound obtained by the above-described synthesis method, or the raw materials of the composite tungsten oxide particles are introduced from the raw material powder feeding nozzle 5 into the thermal plasma at a feed rate of 25 to 50 g/min, using the argon gas of 6 to 98 L/min fed from a gas feeding device 11 as a carrier gas, and a reaction is caused for a predetermined time. After the reaction, the generated composite tungsten oxide ultrafine particles are deposited on a filter 8, and therefore the deposited particles are recovered.

The carrier gas flow rate and the raw material feed rate greatly affect the generation time of the ultrafine particles. Therefore, it is preferable that the carrier gas flow rate is set to 6 L/min or more and 9 L/min or less and the raw material feed rate is set to 25 to 50 g/min.

Further, the plasma gas flow rate is preferably 30 L/min or more and 45 L/min or less, and a sheath gas flow rate is preferably 60 L/min or more and 70 L/min or less. The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. At the same time, the plasma gas and the sheath gas affect the shape of the plasma region, and therefore these gas flow rates are important parameters for shape control of the plasma region. As the plasma gas flow rate and the sheath gas flow rate are increased, the shape of the plasma region extends in a gas flow direction, and a temperature gradient of the plasma tail flame part becomes gentle, and therefore it becomes possible to lengthen the generation time of the ultrafine particles to be produced and to produce the ultrafine particles with high crystallinity. On the contrary, as the plasma gas flow rate and the sheath gas flow rate are decreased, the shape of the plasma region shrinks in the gas flow direction, and the temperature gradient of the plasma tail flame part becomes steep, and therefore it becomes possible to shorten the generation time of the ultrafine particles to be produced and to form the ultrafine particles having a large BET specific surface area. As a result, the value of the XRD peak top intensity ratio of the composite tungsten oxide ultrafine particles of the present invention can be set to a predetermined value.

When the composite tungsten oxide obtained by synthesis using the thermal plasma method has a crystallite size exceeding 200 nm, or when the dispersed particle size of the composite tungsten oxide in the composite tungsten oxide ultrafine particle dispersion liquid obtained from the composite tungsten oxide obtained by the thermal plasma method exceeds 200 nm, the pulverization and dispersion treatment described later can be performed. When the composite tungsten oxide is synthesized by the thermal plasma method, the effect of the present invention is exhibited by appropriately selecting the conditions for the pulverization and dispersion treatment thereafter and setting the value of the XRD peak top intensity ratio to 0.13 or more, thereby suppressing the difference between the average particle size and the crystallite size of the composite tungsten oxide ultrafine particles to 20% or less in near-infrared shielding fine particle dispersion body.

(2) Solid-Phase Reaction Method

The solid-phase reaction method will be described in an order of (i) Raw material used in the solid-phase reaction method, and (ii) Firing in the solid-phase reaction method and its conditions.

(i) Raw Material Used in the Solid-Phase Reaction Method

When synthesizing the composite tungsten oxide ultrafine particles of the present invention by the solid-phase reaction method, a tungsten compound and an M element compound are used as the raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, the element M compound used for producing the raw material of the composite tungsten oxide ultrafine particles expressed by the general formula $M_xW_yO_z$ (wherein M is an element of one or more kinds selected from Cs, Rb, K, Tl, Ba, satisfying $0.001 \le x/y \le 1$, $2.0 < z/y \le 3.0$) which is a more preferable embodiment, is preferably one or more kinds selected from oxides, hydroxides, nitrates, sulfates, chlorides, carbonates of element M.

Further, the composite tungsten oxide ultrafine particles of the present invention may contain a compound containing an impurity element of one or more kinds selected from Si, Al, and Zr (sometimes referred to as "impurity element compound" in the present invention) as a raw material. The impurity element compound does not react with the composite tungsten compound in a subsequent firing step, and works to suppress a crystal growth of the composite tungsten oxide and prevent coarsening of the crystal. The compound containing the impurity element is preferably one or more kinds selected from oxides, hydroxides, nitrates, sulfates, chlorides, carbonates, and colloidal silica and colloidal alumina having a particle size of 500 nm or less are particularly preferable.

The above-described tungsten compound and the aqueous solution containing the M element compound are wet-mixed in such a manner that the ratio of the M element to the W element is $M_xW_yO_z$ (M is the M element, W is tungsten, O is oxygen, satisfying $0.001 \le x/y \le 1.0$, $2.0 < z/y \le 3.0$). When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. At this time, a firing temperature is preferably close to a temperature at which the composite tungsten oxide ultrafine particles start to crystallize. Specifically, the firing temperature is preferably 1000° C. or less, more preferably 800° C. or less, still more preferably 800° C. or less and 500° C. or more. By controlling the firing temperature, the value of the XRD peak top intensity ratio of the composite tungsten oxide ultrafine particles of the present invention can be set to a predetermined value.

In synthesizing the composite tungsten oxide, tungsten trioxide may be used instead of the tungsten compound.

(3) Synthesized Composite Tungsten Oxide Ultrafine Particles

When the composite tungsten oxide ultrafine particle dispersion liquid described later is produced using the composite tungsten oxide ultrafine particles obtained using the synthesis method by the thermal plasma method or the solid-phase reaction method, the dispersed particle size of the ultrafine particles contained in the dispersion liquid is more than 200 nm in some cases. In such a case, the degree of the pulverization and dispersion treatment may be controlled in the step of producing the composite tungsten oxide ultrafine particle dispersion liquid described later. Then, when the value of the XRD peak top intensity ratio of the composite tungsten oxide ultrafine particles obtained through the pulverization and dispersion treatment is within a range of the present invention, the composite tungsten oxide ultrafine particle dispersion body obtained from the composite tungsten oxide ultrafine particles and the dispersion liquid thereof according to the present invention, can exhibit excellent near infrared shielding properties.

[c] Volatile Component of the Composite Tungsten Oxide Ultrafine Particles and its Drying Treatment Method As described above, the composite tungsten oxide ultrafine particles of the present invention contain a volatile component in some cases, but the content of the volatile component is preferably 2.5 mass % or less. However, when the composite tungsten oxide ultrafine particles are exposed to the atmosphere or the like and the content of the volatile component exceeds 2.5 mass %, the content of the volatile component can be reduced by the drying treatment.

Specifically, the composite tungsten oxide synthesized by the above-described method is pulverized and dispersed to obtain finer particles, and the composite tungsten oxide ultrafine particles of the present invention can be produced through a step (pulverization and dispersion treatment step) of producing the composite tungsten oxide ultrafine particle dispersion liquid and a step of drying the composite tungsten oxide ultrafine particle dispersion liquid thus produced to remove the solvent (drying step).

Regarding the pulverizing and dispersing step, in order to describe in detail in the "[d] composite tungsten oxide ultrafine particle dispersion liquid" described later, the drying treatment step will be described here.

The drying treatment step is a step of applying drying treatment to the composite tungsten oxide ultrafine particle dispersion liquid obtained in a pulverizing and dispersing step described later to remove the volatile component in the dispersion liquid, to thereby obtain the composite tungsten oxide ultrafine particles of the present invention.

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the ultrafine particles is easy, but the present invention is not limited thereto.

As an example thereof, (1) A drying treatment by the air dryer, (2) A drying treatment by the vacuum flow drier, and (3) A drying treatment by a spray dryer will be described hereafter. Each drying treatment will be sequentially described hereinafter.

(1) Drying Treatment by an Air Dryer

This is a treatment method for applying drying treatment to the composite tungsten oxide ultrafine particle dispersion liquid obtained by a method described later to remove the volatile component in the dispersion liquid by an air dryer. In this case, it is preferable to perform the drying treatment at a temperature higher than the temperature at which the volatile component volatilizes from the composite tungsten oxide ultrafine particles and the temperature at which the element M is not desorbed, and 150° C. or less is preferable.

The composite tungsten oxide ultrafine particles produced by the drying treatment using the air dryer are weak secondary aggregates. Even in this state, it is possible to disperse the composite tungsten oxide ultrafine particles in a resin or the like, but in order to make it easier to disperse, it is also a preferable configuration to disintegrate the ultrafine particles by a mash-crushing machine or the like.

(2) Drying Treatment by a Vacuum Flow Dryer

This is a treatment method for removing the volatile component in the composite tungsten oxide ultrafine particle dispersion liquid by performing the drying treatment using the vacuum flow drier. In the vacuum flow drier, drying and disintegration treatments are performed at the same time under a reduced pressure atmosphere, and therefore in addition to having a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well.

The drying temperature is preferably set so as to be dried at a temperature at which the element M is not desorbed from the composite tungsten oxide ultrafine particles, and it is a temperature higher than a temperature at which the volatile component is volatilized, and it is desirably 150° C. or less.

(3) Drying Treatment by a Spray Dryer

This is a treatment method for removing the volatile component of the composite tungsten oxide ultrafine particle dispersion liquid by performing drying treatment using a spray dryer. In the spray dryer, secondary aggregation due to a surface force of the volatile component hardly occurs at the time of removing the volatile component in the drying treatment. Accordingly, the composite tungsten oxide ultrafine particles that are not secondary aggregated can be obtained in many cases even without disintegration treatment.

By dispersing the composite tungsten oxide ultrafine particles subjected to the drying treatment according to the above (1) to (3) in the resin or the like by an appropriate method, it is possible to form the composite tungsten oxide ultrafine particle dispersion body which is a near infrared shielding material fine particle dispersion body having optical properties that the haze value is low while having high visible light transmittance and low solar radiation transmittance due to the development of the infrared ray absorbing function.

[d] Composite Tungsten Oxide Ultrafine Particle Dispersion Liquid

The composite tungsten oxide ultrafine particle dispersion liquid for producing the near-infrared shielding dispersion body will be described.

In the composite tungsten oxide ultrafine particle dispersion liquid of the present invention, the composite tungsten oxide ultrafine particles obtained by the above-described synthetic method, water, an organic solvent, a liquid resin, a liquid plasticizer for plastic, a polymeric monomer, or a mixture thereof, and appropriate amount of dispersant, coupling agent, surfactant etc., are pulverized and dispersed using a medium stirring mill.

Then, it is characterized in that a dispersion state of the fine particles in the solvent is good and the dispersed particle size thereof is 1 to 200 nm. It is preferable that the content of the composite tungsten oxide ultrafine particles contained in the composite tungsten oxide ultrafine particle dispersion liquid is 0.01 mass % or more and 80 mass % or less.

The composite tungsten oxide ultrafine particle dispersion liquid of the present invention will be described hereafter in an order of (1) Solvent, (2) Dispersant, (3) Dispersion method, (4) Dispersed particle size, (5) Binder and other additive.

(1) Solvent

The liquid solvent used for the composite tungsten oxide ultrafine particle dispersion liquid is not particularly limited, and it may be appropriately selected according to a coating condition of the composite tungsten oxide ultrafine particle dispersion liquid, a coating environment, and an inorganic binder and a resin binder which are appropriately added. For example, the liquid solvent is water, an organic solvent, a fat or oil, a liquid resin, a liquid plasticizer for medium resin, a polymeric monomer, or a mixture thereof.

Here, as the organic solvent, it is possible to use various types such as alcohol type, ketone type, hydrocarbon type, glycol type, water type and the like can be selected. Specifically, alcoholic solvents such as methanol, ethanol, 1-propanol, isopropanol, butanol, pentanol, benzyl alcohol, diacetone alcohol and the like; ketone type solvents such as acetone, methyl ethyl ketone, methyl propyl ketone, methyl isobutyl ketone, cyclohexanone, isophorone and the like; ester solvents such as 3-methyl-methoxy-propionate; Glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; amides such as formamide, N-methylformamide, dimethylformamide, dimethylacetamide, N-methyl-2-pyrrolidone and the like; aromatic hydrocarbons such as toluene and xylene; ethylene chloride, chlorobenzene, etc. Then, among these organic solvents, dimethyl ketone, methyl ethyl ketone, methyl isobutyl ketone, toluene, propylene glycol monomethyl ether acetate, n-butyl acetate and the like are particularly preferable.

As the fats and oils, vegetable fats and oils or vegetable-derived fats and oils are preferable. As the vegetable oils, drying oils such as linseed oil, sunflower oil, tung oil and eno oil, semidrying oils such as sesame oil, cottonseed oil, rapeseed oil, soybean oil, rice bran oil, poppy seed oil and the like, non-drying oils such as olive oil, coconut oil, palm oil, dehydrated castor oil, are used. As the vegetable oil-derived compound, fatty acid monoesters and ethers obtained by direct esterification reaction of fatty acid of vegetable oil and monoalcohol are used. Further, commercially available petroleum-based solvents can also be used as fats and oils, and Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used.

As the liquid plasticizer for medium resin, known liquid plasticizer typified by organic acid ester type, phosphate type and the like can be used.

This is because in the composite tungsten oxide ultrafine particle dispersion liquid used for producing the near-infrared shielding ultrafine particle dispersion body having plasticity, the plasticity of the near-infrared shielding ultrafine particle dispersion body can be improved by using the liquid plasticizer as a liquid medium. Then, a laminated structure can be formed by sandwiching the obtained near-infrared ray shielding ultrafine particle dispersion body having plasticity between, for example, two or more transparent substrates which transmit at least visible light.

Here, as the liquid plasticizer, for example a plasticizer which is a compound of a monohydric alcohol and an organic acid ester, a plasticizer which is an ester type such as a polyhydric alcohol organic acid ester compound, a plasticizer which is a phosphoric acid type such as an organic phosphate type plasticizer can be used, and any one of them is preferably a liquid state at room temperature. Among them, a plasticizer which is an ester compound synthesized from a polyhydric alcohol and a fatty acid is preferable.

The ester compound synthesized from the polyhydric alcohol and the fatty acid is not particularly limited, and for example, a glycol ester compound obtained by a reaction between a glycol such as triethylene glycol, tetraethylene glycol, tripropylene glycol, and monobasic organic acid such as butyric acid, isobutyric acid, caproic acid, 2-ethylbutyric acid, heptylic acid, n-octylic acid, 2-ethylhexylic acid, pelargonic acid (n-nonylic acid), decylic acid, can be used. Further, an ester compound of tetraethylene glycol, tripropylene glycol, and the above-described monobasic organic, can be used.

Among them, fatty acid ester of triethylene glycol such as triethylene glycol dihexanate, triethylene glycol di-2-ethyl butyrate, triethylene glycol di-octanate, and triethylene glycol di-2-ethylhexanonate, is suitable. Fatty acid ester of triethylene glycol is preferable.

Further, the polymeric monomer is a monomer that forms a polymer by polymerization or the like. As preferable polymer monomers used in the present invention, a methyl methacrylate monomer, an acrylate monomer, and a styrene resin monomer, and the like, can be given.

As described above, the above-described liquid solvents can be used alone or in combination of two or more. Further, if necessary, pH may be adjusted by adding an acid or an alkali to these liquid solvents.

(2) Dispersant

Further, in order to further improve a dispersion stability of the composite tungsten oxide ultrafine particles in the composite tungsten oxide ultrafine particle dispersion liquid and to prevent coarsening of the dispersed particle size by reaggregation, it is also preferable to add various dispersants, surfactants, coupling agents and the like. The dispersants, the coupling agents and the surfactants can be selected according to the application. Therefore, it is preferable to have an amine-containing group, a hydroxyl group, a carboxyl group, or an epoxy group as a functional group. These functional groups adsorb on the surfaces of the composite tungsten oxide ultrafine particles to prevent aggregation and also have an effect of uniformly dispersing the composite tungsten oxide ultrafine particles of the present invention even in the infrared shielding film. It is more preferable that a polymeric dispersant having one of these functional groups in a molecule.

(3) Dispersion Method

By applying the composite tungsten oxide ultrafine particles onto a transparent substrate by an appropriate method or kneading it into a substrate, it is possible to form a near-infrared shielding ultrafine particle dispersion body which is the composite tungsten oxide ultrafine particle dispersion body having near infrared shielding properties such that the haze value is low while having high visible light transmittance and low solar radiation transmittance.

The method for dispersing the composite tungsten oxide ultrafine particles in the dispersion liquid is not particularly limited as long as it is a method capable of uniformly dispersing the fine particles in the dispersion liquid without aggregation. Examples of the dispersion method include a pulverization and dispersion treatment method using a device such as a bead mill, a ball mill, a sand mill, a paint shaker, an ultrasonic homogenizer, or the like. Among them, it is more preferable to use media stirring mills such as a bead mill, a ball mill, a sand mill, or a paint shaker in which media such as beads, balls, ottawa sand is used, because pulverization and dispersion to a desired particle size is possible for a short time by such media stirring mills. Through pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

When the composite tungsten oxide ultrafine particles are dispersed in the plasticizer, it is also preferable to add an organic solvent having a boiling point of 120° C. or less, if desired.

Specifically, toluene, methyl ethyl ketone, methyl isobutyl ketone, butyl acetate, isopropyl alcohol, and ethanol are used as organic solvents having a boiling point of 120° C. or less. The organic solvent can be arbitrarily selected as long as it can uniformly disperse fine particles exhibiting a near-infrared shielding function at a boiling point of 120° C. or less. However, when the organic solvent is added, it is preferable that 5 mass % or less organic solvent is remained in the near-infrared shielding intermediate film described later which is an example of the near infrared shielding ultrafine particle dispersion body. This is because when the residual solvent of the near-infrared shielding intermediate film is 5 mass % or less, no air bubbles are generated in the infrared shielding laminated structure described later, and an appearance and optical properties are kept satisfactory.

(4) Dispersed Particle Size

When the dispersed particle size of each composite tungsten oxide ultrafine particle is 1 to 200 nm, light with a wavelength of 380 nm to 780 nm in a visible light region is not scattered by geometric scattering or Mie scattering, and therefore Haze is reduced and a visible light transmittance can be increased, which is preferable. Further, in a Rayleigh scattering region, the scattered light is decreased in proportion to the particle size of the sixth power, and therefore when the dispersed particle size is decreased, scattering is reduced and transparency is improved. Therefore, when the dispersed particle size is 200 nm or less, the scattered light becomes very small, which is preferable because the transparency is increased.

Here, the dispersed particle size of each composite tungsten oxide ultrafine particle in the composite tungsten oxide ultrafine particle dispersion liquid will be briefly described. The dispersed particle size of each composite tungsten oxide ultrafine particle is a size meaning a single particle of the composite tungsten oxide ultrafine particles dispersed in the solvent or a particle size of aggregated particles in which the composite tungsten oxide ultrafine particles are aggregated, and can be measured with various commercially available particle size distribution meters. For example, a sample of the composite tungsten oxide ultrafine particle dispersion liquid is sampled, and the particle size of the sample can be measured using ELS-8000 manufactured by Otsuka Electronics Co., Ltd. based on the principle of a dynamic light scattering method.

Further, the composite tungsten oxide ultrafine particle dispersion liquid in which the content of the composite tungsten oxide ultrafine particles obtained by the above-described synthetic method is 0.01 mass % or more and 80 mass % or less, is excellent in liquid stability. When an appropriate liquid medium, dispersant, coupling agent, surfactant is selected, gelation of the dispersion liquid and sedimentation of particles do not occur for 6 months or more and the dispersed particle size can be maintained in a range of 1 to 200 nm even when placed in a constant temperature bath at a temperature of 40° C.

Note that the dispersed particle size of the particle in the composite tungsten oxide ultrafine particle dispersion liquid may be different from the average particle size of the composite tungsten oxide ultrafine particles dispersed in the near-infrared shielding material fine particle dispersion body. This is because in the composite tungsten oxide ultrafine particle dispersion liquid, even when the composite tungsten oxide ultrafine particles are aggregated, aggregation of the composite tungsten oxide ultrafine particles is disintegrated when processed from the composite tungsten oxide ultrafine particle dispersion liquid to the near-infrared shielding material fine particle dispersion body.

(5) Binder and Other Additive

One or more kinds selected from resin binders can be appropriately contained in the composite tungsten oxide ultrafine particle dispersion liquid. The type of the resin binder contained in the composite tungsten oxide ultrafine particle dispersion liquid is not particularly limited, and thermoplastic resin such as acrylic resin, and thermosetting resin such as epoxy resin, etc. can be applied as the resin binder.

Further, in order to improve the near infrared shielding properties of the composite tungsten oxide ultrafine particle dispersion body of the present invention, it is also preferable to appropriately add boride ultrafine particles expressed by a general formula $XB_m$ (wherein X is an alkaline earth element or a rare earth element containing yttrium, satisfying $4 \leq m \leq 6.3$) as needed into the dispersion liquid of the present invention. Note that the addition ratio at this time may be appropriately selected according to desired near infrared shielding properties.

Further, in order to adjust a color tone of the composite tungsten oxide ultrafine particle dispersion body, known inorganic pigments such as carbon black and red iron oxide and known organic pigments can be added.

Known ultraviolet absorbers, known near infrared shielding materials of organic substances, and phosphorus-based coloring inhibitors may be added to the composite tungsten oxide ultrafine particle dispersion liquid.

[e] Near-Infrared Shielding Ultrafine Particle Dispersion Body

Explanation will be given for the near-infrared shielding ultrafine particle dispersion body of the present invention in which the composite tungsten oxide ultrafine particles having the near infrared shielding properties are dispersed.

The near-infrared shielding ultrafine particle dispersion body of the present invention is the composite tungsten oxide ultrafine particle dispersion body containing the composite tungsten oxide ultrafine particles obtained by the above production method and a solid medium.

Hereinafter, the composite tungsten oxide ultrafine particle dispersion body of the present invention will be described in an order of (1) Medium, (2) Production method, and (3) additive.

(1) Medium

As a solid medium, a medium resin such as a thermoplastic resin or a thermosetting resin can be used. Further, these media resins may be any one of one kind of resin selected from a resin group consisting of polyethylene terephthalate resin, polycarbonate resin, acrylic resin, styrene resin, polyamide resin, Polyethylene resin, vinyl chloride resin, olefin resin, epoxy resin, polyimide resin, fluorine resin, ethylene.vinyl acetate copolymer, polyvinyl acetal resin, ionomer resin, or a mixture of two or more kinds of resin selected from the above resin group, or copolymers of two or more kinds of resin selected from the above resin group. It is also preferable to add to the medium resin a polymer dispersant having a group containing an amine in a main skeleton, a hydroxyl group, a carboxyl group, or an epoxy group as a functional group.

The near-infrared shielding ultrafine particle dispersion body of the present invention is characterized by containing the composite tungsten oxide ultrafine particles in an amount of 0.001 mass % or more and 80 mass % or less. Then, the near-infrared shielding ultrafine particle dispersion body may be in the form of a sheet, a board or a film. The near-infrared shielding ultrafine particle dispersion body can be applied to various uses by processing into the form of a sheet, a board or a film.

(2) Production Method

A preferable production method of the near-infrared shielding ultrafine particle dispersion body will be described hereafter.

First, a master batch can be obtained by dispersing the composite tungsten oxide ultrafine particles in a resin and pelletizing the resin.

On the other hand, the master batch can also be obtained by a method of uniformly mixing the composite tungsten oxide ultrafine particles, powdery material or pellets of the medium resin, and other additives as necessary, thereafter kneading the mixture with a vent type single-screw or twin-screw extruder, and cutting a common melt-extruded strands to be processed into pellets. In this case, a cylindrical or a prismatic shape can be mentioned as a shape of the master batch. Further, it is also possible to adopt a so-called hot cut method of directly cutting the melt extrudate. In this case, the master batch generally takes a spherical shape.

It is also preferable that in the production step of the master batch described above, the liquid medium contained in the composite tungsten oxide ultrafine particle dispersion liquid is removed to such an amount that the master batch is allowed to remain. Further, it is also preferable that in the production step of the master batch, the composite tungsten oxide ultrafine particles obtained by removing the liquid medium from the composite tungsten oxide ultrafine particle dispersion liquid are used as the composite tungsten oxide ultrafine particles mixed with the medium resin.

In the obtained master batch, by adding the medium resin and kneading, dispersion concentration of the composite tungsten oxide ultrafine particles is adjusted, while maintaining a dispersion state of the composite tungsten oxide ultrafine particles contained in the near-infrared shielding material fine particle dispersion body.

The dispersed particle size of the composite tungsten oxide ultrafine particles is the same as described in "(4) Dispersed Particle size of" [d] Composite tungsten oxide ultrafine particle dispersion liquid".

On the other hand, monomer and oligomer of medium resin and uncured liquid resin precursor and the composite tungsten oxide ultrafine particles are mixed, to obtain the composite tungsten oxide ultrafine particle dispersion liquid, and thereafter the monomer or the like may be cured by a chemical reaction such as condensation or polymerization. For example, when an acrylic resin is used as the medium resin, acrylic monomer or acrylic ultraviolet curing resin and the composite tungsten oxide ultrafine particles are mixed to obtain the composite tungsten oxide ultrafine particle dispersion liquid. Then, the composite tungsten oxide ultrafine particle dispersion body in which acrylic resin is used, can be obtained by filling a predetermined mold with the composite tungsten oxide ultrafine particle dispersion liquid and causing a radical polymerization.

Even when a resin that is cured by crosslinking such as an ionomer resin is used as a resin medium, a dispersion body can be obtained by subjecting the composite tungsten oxide ultrafine particle dispersion liquid to a crosslinking reaction as in the case of using the acrylic resin described above.

Further, the composite tungsten oxide ultrafine particle dispersion liquid can be obtained by mixing the composite tungsten oxide ultrafine particles and a liquid medium. Here, known liquid plasticizers can also be used for the liquid medium. The near-infrared shielding ultrafine particle dispersion body can be obtained by mixing the obtained dispersion liquid with the medium resin and removing the liquid medium to an amount that allows the residue to remain in the near-infrared shielding material fine particle dispersion body by known heat treatment or the like. Note that when a liquid plasticizer is used for the liquid medium, a total amount of the liquid plasticizer may remain in the near-infrared shielding ultrafine particle dispersion body.

(3) Additive

Further, when a medium resin is used as the solid medium, usually, known additives such as a plasticizer, a flame retardant, a coloring inhibitor and a filler added to these resins can be added.

However, the solid medium is not limited to the medium resin, and it is also possible to use a binder in which metal alkoxide is used. Alkoxides such as Si, Ti, Al, Zr and the like are representative as the metal alkoxide. It is possible to form a dispersion body composed of an oxide layer by hydrolyzing/polycondensing the binder using these metal alkoxides by heating or the like.

[f] the Near-Infrared Shielding Ultrafine Particle Dispersion Body in the Form of a Sheet, a Board or a Film It is also preferable that the near-infrared shielding ultrafine particle dispersion body of the present invention takes a form of a sheet, a board or a film.

Hereinafter, the near infrared shielding ultrafine particle dispersion body of the present invention in the form of a sheet, a board, or a film will be described in an order of (1) Constituent component, (2) Production method, and (3) Application method.

(1) Constituent Component

The near-infrared shielding ultrafine particle dispersion body in the form of a sheet a board, or a film can be produced by uniformly mixing the composite tungsten oxide ultrafine particles and a plasticizer dispersion liquid or the master batch into the transparent resin.

In the case of producing the near-infrared shielding ultrafine particle dispersion body in the form of a sheet, a board or a film, various thermoplastic resins can be used for the resin constituting the sheet, the film or the board. Then, in consideration of the fact that the near-infrared shielding ultrafine particle dispersion body in the form of a sheet, a board or a film is applied to an optical filter, the medium resin such as thermoplastic resin or thermosetting resin having sufficient transparency is preferable.

Specifically, preferable resin can be selected from the resin selected from a resin group such as polyethylene terephthalate resin, polycarbonate resin, acrylic resin, styrene resin, polyamide resin, polyethylene resin, vinyl chloride resin, olefin resin, epoxy resin, polyimide resin, ionomer resin, a fluororesin, and an ethylene-vinyl acetate copolymer, or a mixture of two or more resins selected from the resin group, or a copolymer of two or more resins selected from the resin group.

Further, there is a case that the near-infrared shielding ultrafine particle dispersion body in the form of a sheet, a board, or a film is used as an intermediate film of laminated glass, and a case that the thermoplastic resin constituting the sheet, the film or the board does not have sufficient flexibility or adhesion to the transparent substrate as it is. For example, when the thermoplastic resin is a polyvinyl acetal resin, it is preferable to further add a plasticizer.

As the above-described plasticizer, a substance used as a plasticizer in the thermoplastic resin used in the present invention can be used. For example, as a plasticizer used for the infrared shielding film made of polyvinyl acetal resin, a plasticizer which is a compound of monohydric alcohol and organic acid ester, a plasticizer which is an ester type such as a polyhydric alcohol organic acid ester compound, and a plasticizer which is a phosphoric acid type such as an organic phosphate type plasticizer, can be used. Any of the plasticizers is preferably a liquid state at room temperature. Among them, a plasticizer which is an ester compound synthesized from a polyhydric alcohol and a fatty acid is preferable.

(2) Production Method

The near-infrared shielding ultrafine particle dispersion body can be produced by kneading any one of the composite tungsten oxide ultrafine particles, the plasticizer dispersion liquid and the master batch, thermoplastic resin, and plasticizer and other additives as required, and thereafter extruding the kneaded product into the form of a sheet, a board or a film by a known extrusion molding method and injection molding method.

A known method can be used as a method for forming the near-infrared shielding ultrafine particle dispersion body in the form of a sheet, a board form or a film. For example, a calendar roll method, an extrusion method, a casting method, an inflation method, or the like can be used.

(3) Application Method

The near-infrared shielding ultrafine particle dispersion body can be applied to various uses by processing it into the form of a sheet, a board, or a film. As an embodiment of the near-infrared shielding ultrafine particle dispersion body, a solar radiation shielding intermediate film can be given.

By interposing the near infrared shielding ultrafine particle dispersion body in the form of a sheet, a board or a film between a plurality of transparent substrates made of a plate glass or a plastic material of two or more transparent substrates that transmits at least a visible light, it is possible to obtain a solar radiation laminated structure having a visible near-infrared shielding function while transmitting a visible light. This is an example in which the near infrared shielding material fine particle dispersion body of the present invention is used for the solar radiation shielding intermediate film of the present invention.

Namely, the infrared shielding laminated structure of the present invention sandwiches an intermediate film having a near infrared shielding function from both sides thereof using a transparent substrate. As the transparent substrate, the plate glass which is transparent in the visible light region, a plate-like plastic, or a film-like plastic is used. The material of the plastic is not particularly limited, and it can be selected according to the application, and polycarbonate resin, acrylic resin, polyethylene terephthalate resin, polyamide resin, vinyl chloride resin, olefin resin, epoxy resin, polyimide resin, ionomer resin, fluororesin, or the like can be used.

Further, the infrared-shielding laminated structure of the present invention can also be obtained by a known method, by adhering and integrating a plurality of transparent substrates facing each other with the near-infrared shielding ultrafine particle dispersion body in the form of a sheet, a board, or a film interposed between them.

As described for the solar radiation shielding intermediate film of the present invention, the solar radiation shielding intermediate film of the present invention is an embodiment of the near-infrared shielding ultrafine particle dispersion body. It is a matter of course that the near-infrared shielding ultrafine particle dispersion body of the present invention can be used without being sandwiched between a plurality of transparent substrates made of a plate glass or a plastic material of two or more transparent substrates which transmit a visible light. Namely, the near-infrared shielding ultrafine particle dispersion body in the form of a sheet, a board or a film of the present invention can be formed as the near-infrared shielding ultrafine particle dispersion body alone.

Note that details of the solar radiation shielding intermediate film and the infrared shielding laminated structure of the present invention will be described later.

[g] Infrared Shielding Film, Infrared Shielding Glass

The infrared shielding film and the infrared shielding glass are examples of the near-infrared shielding ultrafine particle dispersion body.

The infrared shielding film or the infrared shielding glass can be produced by forming a coating layer which is the near infrared shielding ultrafine particle dispersion body in which the composite tungsten oxide ultrafine particles are dispersed in a solid medium, on the transparent substrate selected from a substrate film or a substrate glass, using the above-described near-infrared shielding ultrafine particle dispersion liquid.

When the above-described composite tungsten oxide ultrafine particle dispersion liquid is mixed with a solid medium such as a resin or a polymer monomer to prepare a coating liquid, and a coating layer is formed on the transparent substrate by a known method, the coating layer becomes the near-infrared shielding ultrafine particle dispersion body because the composite tungsten ultrafine particles are dispersed in the solid medium. By providing the composite tungsten ultrafine particle dispersion body on the surface of the substrate film or the substrate glass, an infrared shielding film or infrared shielding glass can be produced.

As the solid medium, a medium resin or an inorganic substance can be used.

For example, the infrared shielding film can be prepared as follows.

A medium resin is added to the near-infrared shielding ultrafine particle dispersion liquid to obtain a coating liquid. When the surface of the film substrate is coated with this coating liquid and the solvent is evaporated and the resin is cured by a predetermined method, it becomes possible to form the coating layer in which the near-infrared shielding ultrafine particles are dispersed in the medium.

As the medium resin of the coating layer, for example a UV curing resin, a thermosetting resin, an electron beam curing resin, a room temperature curing resin, a thermoplastic resin and the like can be selected according to a purpose. Specifically, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, ionomer resin, polycarbonate resin, acrylic resin, polyvinyl butyral resin, PET resin, polyamide resin, polyimide resin, olefin resin, etc., can be used. Further, a polymeric dispersant having these resins as a main backbone and having a group containing an amine, a hydroxyl group, a carboxyl group, or an epoxy group as a functional group may be used as the medium resin.

These resins may be used alone or in combination. Among the media for the coating layer, it is particularly preferable to use a UV curing resin binder from a viewpoint of productivity and a device cost.

Further, as a solid medium, it is also possible to use a binder in which metal alkoxide or organosilazane is used. As the metal alkoxide, alkoxides such as Si, Ti, Al, Zr and the like are representative. The binder in which these metal alkoxides are used, can form the coating layer composed of an oxide layer by hydrolysis/polycondensation by heating or the like.

Further, it is also preferable that by applying a coating liquid containing an alkoxide containing at least one of silicon, zirconium, titanium, and aluminum and/or a partially hydrolyzed polycondensation product of the alkoxide, on the coating layer, followed by heating, and a coating layer of an oxide containing at least one of silicon, zirconium, titanium, and aluminum is formed on the coating layer, to thereby obtain a multilayer structure. This is because by adopting such a structure, a coated component is deposited while filling the gaps in which the composite tungsten oxide ultrafine particles are deposited as the first layer, and in order to suppress refraction of the visible light, the haze value of the layer is further reduced, and the visible light transmittance is improved, and further, the adhesion of the composite tungsten oxide ultrafine particles on the substrate is improved. Here, as a method for forming a coating layer composed of alkoxide containing at least one of silicon, zirconium, titanium, and aluminum and partial hydrolysis and polycondensation products thereof, on the layer made of the composite tungsten oxide ultrafine particles alone or mainly composed of the composite tungsten oxide ultrafine particles, the coating method is convenient from a viewpoint of ease of layer forming operation and cost.

The coating liquid used in the coating method is obtained by containing alkoxide containing one or more kinds of silicon, zirconium, titanium, and aluminum, or one or more partial hydrolytic condensation polymerized products of the alkoxide, in the solvent such as water or alcohol. The content thereof is preferably 40 mass % or less in terms of oxide in the coating obtained after heating. Further, it is also preferable to adjust pH by adding an acid or an alkali as necessary. An oxide coating layer of silicon, zirconium, titanium, aluminum or the like can be easily formed by applying the coating liquid as a second layer on a layer mainly composed of the composite tungsten oxide ultrafine particles followed by heating. In addition, it is also preferable to use an organosilazane solution as a component of the binder component or the coating liquid used in the coating liquid of the present invention.

In addition to the above-described method, the coating layer may be formed by coating the surface of the substrate film or substrate glass with the composite tungsten oxide ultrafine particle dispersion liquid and thereafter coating it with a binder in which the medium resin or the metal alkoxide is used.

The substrate heating temperature after coating the tungsten oxide ultrafine particle dispersion liquid containing a metal alkoxide of silicon, zirconium, titanium, or aluminum and a hydrolyzed polymer thereof as an inorganic binder or a coating layer is preferably performed at 100° C. or more and further preferably at the boiling point of the solvent in the coating liquid. This is because when the substrate heating temperature is 100° C. or more, the polymerization reaction of the metal alkoxide or the hydrolyzed polymer of the metal alkoxide contained in the coating layer can be completed. Further, this is because when the substrate heating temperature is 100° C. or more, water or an organic solvent as a solvent does not remain in the layer, and therefore in the layer after heating, these solvents do not cause reduction of the visible light transmittance.

Note that, the above-described film substrate is not limited to the form of a film, and it may be, for example, the form of a board or a sheet. As the material of the film substrate, PET, acrylic, urethane, polycarbonate, polyethylene, ethylene vinyl acetate copolymer, vinyl chloride, and fluorine resin, etc., can be used according to various purposes. The infrared shielding film is preferably a polyester film, more preferably a PET film.

Further, the surface of the film substrate is preferably subjected to a surface treatment in order to realize easy adhesion of the coating layer. Further, it is also preferable that in order to improve an adhesion between the glass substrate or the film substrate and the coating layer, the interlayer is formed on the glass substrate or the film substrate, and the coating layer is formed on the interlayer. The constitution of the interlayer is not particularly limited, and it can be constituted for example by a polymer film, a metal layer, an inorganic layer (such as silica, titania, zirconia or the like), an organic/inorganic composite layer or the like.

The method for providing the coating layer on the substrate film or the substrate glass is not particularly limited as long as it is a method capable of uniformly coating the surface of the substrate with the near infrared ray shielding ultrafine particle dispersion liquid. For example, a method for uniformly applying a treatment liquid flatly and thinly, such as a bar coating method, a gravure coating method, a spray coating method, a dip coating method, a spin coating method, a screen printing method, a roll coating method, flow coating, or the like, can be preferably used.

For example, according to the bar coating method using the UV curing resin, the coating layer can be formed on the substrate film or the substrate glass in such way that the surface of the substrate film or the substrate glass is coated with the coating liquid prepared by appropriately adjusting a liquid concentration and an additive so as to have appropriate leveling properties, using a wire bar of a bar number which can satisfy the purpose of a thickness of the coating layer and a content of the near-infrared shielding ultrafine particles. At this time, drying conditions for the coating layer are varied depending on each component, solvent type and usage ratio, but are usually about 60° C. to 140° C. for about 20 seconds to 10 minutes. Ultraviolet irradiation is not particularly limited, and a UV exposure machine such as an extra-high pressure mercury lamp can be suitably used, for example.

In addition, it is possible to manipulate the adhesion between the substrate and the coating layer, smoothness of the coating layer at the time of coating, drying properties of the organic solvent, and the like, before and after formation of the coating layer (pre/post steps). As the pre/post steps, for example, a surface treatment step of the substrate, a pre-bake (preheating of the substrate) step, a post bake (post-heating of the substrate) step, and the like can be given and appropriately selected. The heating temperature in the pre-bake step and/or post-bake step is preferably 80° C. to 200° C., and the heating time is preferably 30 seconds to 240 seconds.

The thickness of the coating layer on the substrate film or on the substrate glass is not particularly limited, but in practice it is preferably 10 µm or less, and more preferably 6 µm or less. This is because when the thickness of the coating layer is 10 µm or less, sufficient pencil hardness is exhibited and scratch resistance is exhibited, and in addition, occurrence of step abnormality such as occurrence of warping of the substrate film can be avoided when the solvent in the coating layer is volatilized and when the binder is cured.

[h] Infrared Shielding Laminated Structure

The infrared shielding laminated structure of the present invention is formed in such a way that the solar radiation shielding intermediate film in the form of a sheet or a film is interposed between a plurality of transparent substrates made of a plate glass or plastic, as the interlayer.

Hereinafter, the infrared shielding laminated structure of the present invention will be described in an order of (1) Solar radiation shielding intermediate film, (2) Solar radiation shielding intermediate film in the form of a sheet or a film, and (3) Method for producing an infrared shielding laminated structure.

(1) Solar Radiation Shielding Intermediate Film

The solar radiation shielding intermediate film of the present invention is characterized by containing the composite tungsten oxide ultrafine particles obtained in the above-described production method, and the medium resin. Then, the medium resin is preferably any one of one resin selected from a resin group such as acrylic resin, styrene resin, vinyl chloride resin, olefin resin, epoxy resin, fluororesin, ethylene.vinyl acetate copolymer, polyvinyl acetal resin and ionomer resin, or a mixture of two or more resins selected from the above resin group, or a copolymer of two or more resins selected from the above resin group. When the medium resin is the polyvinyl acetal resin or the ionomer resin, this is more preferable from a viewpoint of improving the adhesion strength between the solar radiation shielding intermediate film and the transparent substrate.

Further, in the solar radiation shielding intermediate film of the present invention, it is preferable that 0.001 mass % or more and 80 mass % or less of the above-described composite tungsten oxide ultrafine particles are contained.

An example of a method for producing the composite tungsten oxide ultrafine particle dispersion body to be the solar radiation shielding intermediate film will be described hereafter.

By mixing the composite tungsten oxide ultrafine particle dispersion liquid and the liquid plasticizer for the medium resin and thereafter removing the solvent component having a boiling point of 120° C. or less, a dispersion powder containing the composite tungsten oxide ultrafine particles, and a plasticizer dispersion liquid can be obtained. Further, by removing the solvent component having a boiling point of 120° C. or less from the composite tungsten oxide ultrafine particle dispersion liquid containing an appropriate amount of dispersant, a dispersion powder containing the composite tungsten oxide ultrafine particles can be obtained. As a method for removing the solvent component from the composite tungsten oxide ultrafine particle dispersion liquid, it is preferable to dry the composite tungsten oxide ultrafine particle dispersion liquid under reduced pressure. Specifically, the composite tungsten oxide ultrafine particle dispersion liquid is dried under reduced pressure while stirring, and the composite tungsten oxide ultrafine particles-containing composition and a solvent component are separated. As a device used for the reduced pressure drying, a vacuum stirring type dryer can be mentioned, but it is not particularly limited as long as it is a device having the above-described function. Further, a pressure value at the time of the reduced pressure in the drying step is appropriately selected.

By using the reduced pressure drying method, efficiency of removing the solvent from the composite tungsten oxide ultrafine particle dispersion liquid is improved, and the dispersion powder and the plasticizer dispersion liquid are not exposed to a high temperature for a long time, and therefore aggregation of the composite tungsten oxide ultrafine particles dispersed in the dispersion powder or the plasticizer dispersion liquid does not occur, which is preferable. Further, the productivity of the dispersion powder and the plasticizer dispersion liquid is increased, and the evaporated solvent can be easily recovered, which is preferable from a viewpoint of environmental consideration.

In the dispersion powder and the plasticizer dispersion liquid obtained after the drying step, a residual solvent is preferably 2.5 mass % or less. This is because when the residual solvent is 2.5 mass % or less, bubbles do not occur when processing the dispersion powder or the plasticizer dispersion liquid, for example, into a laminated structure, and good appearance and satisfactory optical properties are maintained. Further, this is because when the solvent remaining in the dispersion powder is 2.5 mass % or less, when stored for a long time in a state of the dispersion powder, aggregation due to natural drying of the residual solvent does not occur and long-term stability is maintained.

The solar radiation shielding intermediate film can be produced by molding by a known molding method, after mixing the dispersion powder and the plasticizer dispersion liquid described above uniformly into the medium resin which is transparent to at least a visible light, by a known mixing method. It is also possible to produce the solar radiation shielding intermediate film even by diluting the masterbatch with the medium resin, the masterbatch being obtained by dispersing the composite tungsten oxide ultrafine particles of high content in the medium resin and dispersing the composite tungsten oxide ultrafine particles in the masterbatch, in addition to the production using the dispersion powder and the plasticizer dispersion liquid containing the composite tungsten oxide ultrafine particles.

(2) Solar Radiation Shielding Intermediate Film in the Form of a Sheet or a Film.

By uniformly mixing the above-described dispersion powder and the plasticizer dispersion liquid into the medium resin which is transparent to at least a visible light by a known method, and thereafter molding the mixture by a known molding method, the solar radiation shielding intermediate film in the form of a sheet or a film can be produced.

Further, when the solar radiation shielding intermediate film in the form of a sheet or a film, does not have sufficient flexibility and adhesion to the transparent substrate, it is preferable to add the liquid plasticizer for the medium resin. For example, when the medium resin used for the solar radiation shielding intermediate film is a polyvinyl acetal resin, the addition of the liquid plasticizer for the polyacetal resin is beneficial for improving the adhesion to the transparent substrate.

It is possible to use a substance used as a plasticizer for the medium resin, as the plasticizer. For example, as a plasticizer to be used for an infrared shielding film made of polyvinyl acetal resin, a plasticizer which is a compound of a monohydric alcohol and an organic acid ester, a plasticizer which is an ester type such as a polyhydric alcohol organic acid ester compound, and a plasticizer which is a phosphoric acid type such as an organic phosphate type plasticizer, can be used. Any one of the plasticizers is preferably liquid at room temperature. Among them, the plasticizer which is an ester compound synthesized from polyhydric alcohol and fatty acid is preferable.

Further, at least one kind selected from the group consisting of a silane coupling agent, metal salt of carboxylic acid, hydroxide of a metal, and a carbonate of a metal, can be added into the solar radiation shielding intermediate film in the form of a sheet or a film. The metal constituting the carboxylic acid metal salt, metal hydroxide, metal carbonate, is preferably at least one kind selected from sodium, potassium, magnesium, calcium, manganese, cesium, lithium, rubidium, and zinc. The content of at least one kind selected from the group consisting of the metal salt of the carboxylic acid, the hydroxide of the metal, and the carbonate of the metal, is preferably 1 mass % or more and 100 mass % or less based on the composite tungsten oxide ultrafine particles.

Further, it is also possible to mix the composite tungsten oxide ultrafine particles, oxide fine particles containing two or more kinds selected from a group consisting of Sb, V, Nb, Ta, W, Zr, F, Zn, Al, Ti, Pb, Ga, Re, Ru, P, Ge, In, Sn, La, Ce, Pr, Nd, Gd, Tb, Dy, Ho, Y, Sm, Eu, Er, Tm, Tb, Lu, Sr, Ca, and at least one kind of the oxide fine particles, the composite oxide fine particles, and boride fine particles, in a weight ratio of 95:5 to 5:95.

For example, it is possible to produce the solar radiation shielding intermediate film in the form of a sheet by kneading the dispersion powder or the plasticizer dispersion liquid or the masterbatch, the medium resin, a plasticizer and other additive if desired, thereafter molding the kneaded product into a flat or curved surface by a known method such as an extrusion molding method and an injection molding method.

A publicly known method can be used for forming the solar radiation shielding intermediate film in the form of a sheet or a film. For example, a calendar roll method, an extrusion method, a casting method, or the like can be used.

Further, in the composite tungsten oxide ultrafine particles contained in the solar radiation shielding intermediate film, the volatile component is sometimes contained up to 2.5 mass % due to passing through the composite tungsten oxide ultrafine particle dispersion liquid in a production process of the near-infrared shielding material fine particle dispersion body or depending on a preservation state of the composite tungsten oxide ultrafine particles.

(3) Method for Producing an Infrared Shielding Laminated Structure

Explanation will be given for the infrared shielding laminated structure formed by interposing the solar radiation shielding intermediate film in the form of a sheet or a film between a plurality of transparent substrates made of the plate glass or plastic material.

The infrared shielding laminated structure is obtained by sandwiching the interlayer from both sides thereof using the transparent substrate which allows at least a visible light to transmit. The plate glass, or the plastic in the form of a plate, or the plastic in the form of a film, which are transparent in a visible light region, is used as the transparent substrate. The material of the plastic is not particularly limited, and it can be selected according to the application, and polycarbonate resin, acrylic resin, polyethylene terephthalate resin, PET resin, polyamide resin, vinyl chloride resin, polycarbonate resin, olefin resin, epoxy resin, polyimide resin, ionomer resin, and fluororesin, etc., can be used.

Further, as the transparent substrate, plastic containing fine particles having a solar radiation shielding function may be used. As the fine particles having a solar radiation shielding function, the composite tungsten oxide ultrafine particles having near-infrared shielding properties can be used. Namely, the plastic containing fine particles having the solar radiation shielding function, is formed into a form of a board, a sheet, or a film, in which fine particles having a solar radiation shielding function are dispersed in the resin that can be used in the present invention.

The infrared shielding laminated structure of the present invention is produced using the solar radiation shielding intermediate film as the interlayer in the form of a sheet or a film of the present invention, so that transparent substrates are integrally adhered to each other by a known method, the transparent substrates being a plurality of facing plate glasses, plastics, and plastics containing fine particles having the solar radiation shielding function, with the interlayer sandwiched between them.

The interlayer may have a structure of a plurality of laminated layers. When the interlayer is constituted by a plurality of layers, it is sufficient that at least one layer is the solar radiation shielding intermediate film of the present invention. Further, at least one layer of the intermediate film may contain an ultraviolet absorber. As the ultraviolet absorber, a compound having a malonic acid ester structure, a compound having an oxalic acid anilide structure, a compound having a benzotriazole structure, a compound having a benzophenone structure, a compound having a triazine structure, a compound having a benzoate structure, and a compound having a hindered amine structure, can be used.

Note that it is a matter of course that the interlayer may be composed of only the solar radiation shielding intermediate film of the present invention.

EXAMPLES

The present invention will be specifically described hereafter, with reference to examples. However, the present invention is not limited to the examples described below.

Note that the optical properties of the dispersion liquid and the coating layer in the examples and comparative examples were measured using a spectrophotometer (U-4100, manufactured by Hitachi, Ltd.), and the visible light transmittance and the solar radiation transmittance were calculated according to JIS R 3106. Further, the dispersed particle size was shown by an average value measured by a particle size measuring device based on dynamic light scattering method (ELS-8000 manufactured by Otsuka Electronics Co., Ltd.).

Further, the content of the volatile component of examples and comparative examples was measured using a Moisture Analyzer MOC 63u manufactured by Shimadzu Corporation as follows: a temperature was raised from room temperature to 125° C. for 1 minute from the start of measurement, and kept at 125° C. for 9 minutes, and a weight reduction rate of a measurement sample after 10 minutes from the start of measurement was taken as the content of the volatile component. The average particle size of each composite tungsten oxide ultrafine particle dispersed in the near-infrared shielding material particle dispersion body and the solar radiation shielding intermediate film was measured by observing a transmission electron microscope image of the cross-section of the dispersion body and the intermediate film. The transmission electron microscope image was observed using a transmission electron microscope (HF-2200, manufactured by Hitachi High-Technologies Corporation). The transmission electron microscopic image was processed using an image processing device to measure the particle size of 100 composite tungsten oxide ultrafine particles and the average value thereof was taken as the average particle size. An X-ray diffraction pattern was measured by a powder X-ray diffraction method (θ-2θ method) using a powder X-ray diffractometer (X'Pert-PRO/MPD manufactured by Spectris Co., Ltd. PANalytical). Further, in order to ensure objective quantification, every time the X-ray diffraction pattern of the composite tungsten oxide ultrafine particles was measured, the X-ray diffraction pattern of a silicon powder standard sample was measured, and the peak intensity ratio was calculated each time.

Example 1

0.216 kg of $Cs_2CO_3$ was dissolved in 0.330 kg of water, which was then added to 1.000 kg of $H_2WO_4$, sufficiently stirred, and then dried to obtain a mixed powder of $Cs_{0.33}WO_3$ as a target composition.

Next, the high-frequency plasma reaction device described in FIG. 1 was used, and the inside of the reaction system was evacuated to about 0.1 Pa (about 0.001 Torr) by a vacuum evacuation device, and then the inside of the reaction system was completely replaced with argon gas to obtain a flow system of 1 atm. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min and 5 L/min. Then, high-frequency power was applied to a water cooled copper coil to generate high-frequency plasma. At this time, in order to generate thermal plasma having a high temperature part of 10000 to 15000 K, the high-frequency power was set to 40 KW.

In this way, after generating the high-frequency plasma, the mixed powder was supplied into the thermal plasma at a rate of 50 g/min while feeding the argon gas as a carrier gas at a flow rate of 9 L/min from the gas feeding device 11.

As a result, the mixed powder was instantaneously evaporated in the thermal plasma, and rapidly solidified in a process of reaching the plasma tail flame part, resulting in ultrafine particles. The generated ultrafine particles were deposited on a recovery filter.

The deposited ultrafine particles were recovered, and the X-ray diffraction pattern was measured by a powder X-ray diffraction method (θ-2θ method) using a powder X-ray diffractometer (X'Pert-PRO/MPD manufactured by Spectris Corporation PANalytical).

Figure 2:
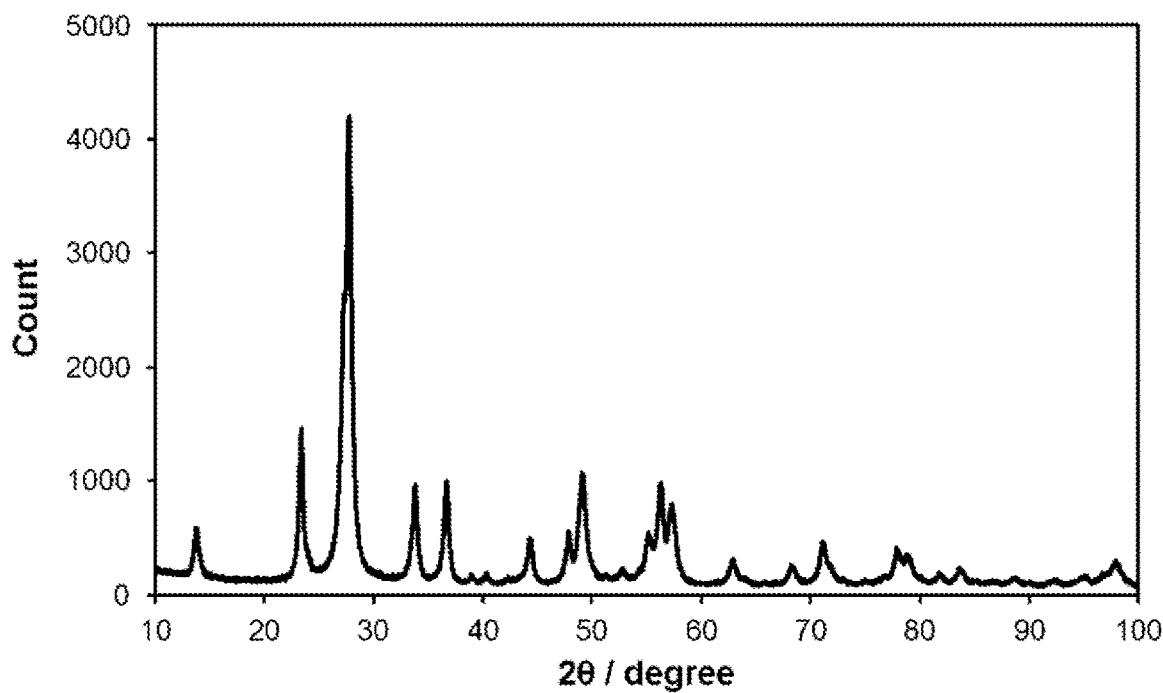
FIG. 2 is an X-ray diffraction pattern of ultrafine particles according to example 1.

The X-ray diffraction pattern of the obtained ultrafine particles is shown in FIG. 2. As a result of phase identification, the obtained ultrafine particles were identified as a hexagonal $Cs_{0.33}WO_3$ single phase. Further, when crystal structure analysis by the Rietveld analysis method was performed using the X-ray diffraction pattern, the crystallite size of each obtained ultrafine particles was 18.8 nm. Further, the value of the peak top intensity of the X-ray diffraction pattern of the obtained ultrafine particles was 4200 counts.

The composition of the obtained ultrafine particles was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained ultrafine particles was measured using a BET specific surface area measuring device (HM model 1208 manufactured by Mountech Corporation), it was 60.0 m$^2$/g. Note that nitrogen gas having a purity of 99.9% was used for measurement of the BET specific surface area.

Further, when the content of the volatile component of the composite tungsten oxide ultrafine particles of example 1 was measured, it was 1.6 mass %.

20 parts by weight of the obtained composite tungsten oxide ultrafine particles, 64 parts by weight of methyl isobutyl ketone (MIBK), and 16 parts by weight of an acrylic polymer dispersant (amine value: 48 mg KOH/g, acrylic dispersant having a decomposition temperature of 250° C.) having a group containing an amine as a functional group (referred to as "dispersant a" hereafter) were mixed, to prepare a slurry of 3 kg. This slurry was charged into a medium stirring mill together with beads and subjected to pulverization and dispersion treatment for 1 hour. Note that a horizontal cylindrical annular type (manufactured by Ashizawa Co., Ltd.) was used as the medium stirring mill, in which an inner wall of a vessel and a material of a rotor (rotary stirring part) were made of zirconia. Further, beads made of YSZ (Yttria-Stabilized Zirconia: yttria-stabilized zirconia) having a diameter of 0.1 mm were used as the beads. A rotation speed of the rotor was set to 14 rpm/sec, and a flow rate of the slurry was set to 0.5 kg/min to perform pulverization and dispersion treatment to obtain the composite tungsten oxide ultrafine particle dispersion liquid of example 1.

The composite tungsten oxide ultrafine particles contained in the composite tungsten oxide ultrafine particle dispersion liquid of example 1, namely, the value of the peak top intensity in the X-ray diffraction pattern of the composite tungsten oxide ultrafine particles after the pulverization and dispersion treatment was 3000 counts, and a peak position was 2θ=27.8°.

On the other hand, when a silicon powder standard sample (NIST, 640c) was prepared, and a value of the peak intensity was measured with plane (220) in this silicon powder standard sample as a reference, it was 19800 counts. Accordingly, it was found that the value of the XRD peak intensity ratio of the composite tungsten oxide ultrafine particles after the pulverization and dispersion treatment according to example 1 was 0.15 when the peak intensity value of the standard sample was set to 1.

Further, the crystallite size of each composite tungsten oxide ultrafine particle after the pulverization and dispersion treatment according to example 1 was 16.9 nm.

Further, when the dispersed particle size of each particle in the composite tungsten oxide ultrafine particle dispersion liquid of example 1 was measured using a particle size measuring device based on a dynamic light scattering method, it was 70 nm. Note that as a setting of a particle size measurement, a particle refractive index was set to 1.81, and a particle shape was set as nonspherical. Further, a background was measured using methyl isobutyl ketone and a solvent refractive index was set to 1.40.

The composite tungsten oxide ultrafine particle dispersion liquid of example 1 was mixed with ultraviolet curing resin and solvent methyl isobutyl ketone, and a glass substrate having a thickness of 3 mm was coated with this composite tungsten oxide ultrafine particle dispersion liquid to form a coating layer using a bar coater (IMC-700 manufactured by Imoto Seisakusho), and the solvent was evaporated from this coating layer, and then ultraviolet irradiation was performed to cure the coating layer, to thereby obtain an infrared-shielding glass of example 1. At this time, the concentration of the dispersion liquid was previously adjusted by diluting the solvent with methyl isobutyl ketone so that the infrared shielding glass had a visible light transmittance of 70%.

When the average particle size of the composite tungsten oxide ultrafine particles dispersed in the infrared shielding glass of example 1 was calculated by an image processing device using a transmission electron microscope image, it was 17 nm, and was almost the same as the above-described crystallite size of 16.9 nm.

Figure 3:
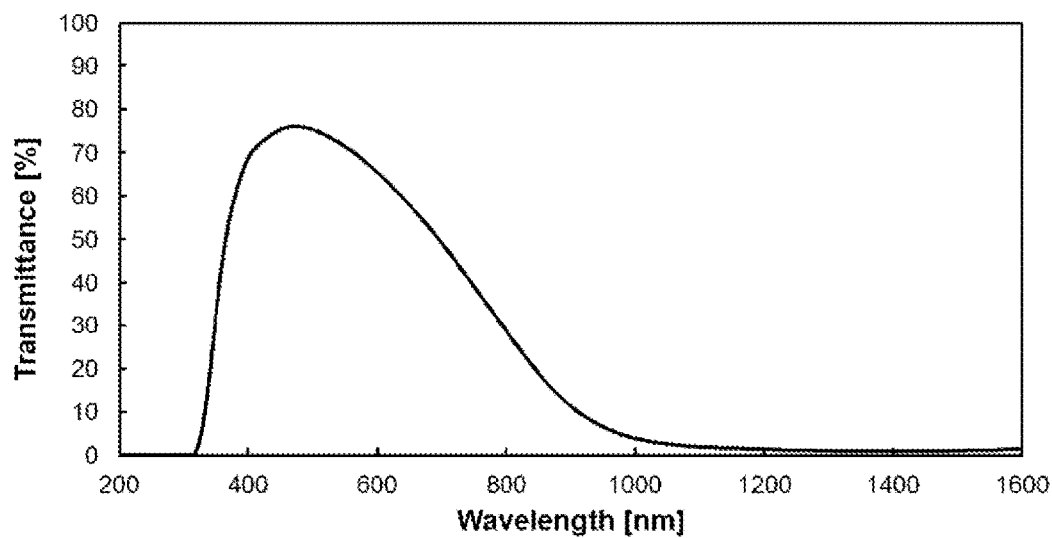
FIG. 3 is a profile of a transmittance of an infrared shielding glass according to example 1.

When the haze of the obtained infrared shielding glass of example 1 was measured based on JIS K 7105 using a haze meter (HM-150, manufactured by Murakami Color Research Laboratory), it was 0.4%. Further, when the transmittance of the obtained infrared shielding glass of example 1 was measured at interval of 5 nm in a wavelength range of 200 nm to 2600 nm by a spectrophotometer, a transmission profile shown in FIG. 3 was obtained. When the solar radiation transmittance was obtained from the obtained transmission profile, it was 36.5%. Further, the infrared shielding glass of example 1 was irradiated with a pseudo sunlight using an artificial sunlight (XC-100, manufactured by Celic Corporation), and the presence or absence of a blue haze phenomenon was visually confirmed. As a result, it was confirmed that there was no blue haze phenomenon.

Examples 2 to 6

The composite tungsten oxide ultrafine particles and the composite tungsten oxide ultrafine particle dispersion liquid of examples 2 to 6 were produced in the same manner as in examples 1, except that the carrier gas flow rate, the plasma gas flow rate, the sheath gas flow rate, and the raw material feed rate were changed. Table 1 shows the changed carrier gas flow rate condition, material feed rate condition, and other conditions. Evaluations similar to those of example 1 were performed for the composite tungsten oxide ultrafine particles and the composite tungsten oxide ultrafine particle dispersion liquid of examples 2 to 6. The evaluation results are shown in Table 2.

Further, the infrared shielding glass of examples 2 to 6 were obtained and evaluated in the same manner as the infrared shielding glass of example 1 except that the composite tungsten oxide ultrafine particle dispersion liquid of examples 2 to 6 was used. The results are shown in Table 3.

Example 7

The mixed powder of Cs$_2$CO$_3$ and H$_2$WO$_4$ described in example 1 was changed to the composite tungsten oxide expressed by Cs$_{0.33}$WO$_3$ fired at 800° C. under a mixed gas atmosphere of nitrogen gas and hydrogen gas, and was used as a raw material to be charged into a high-frequency plasma reactor. Other than the above material, the composite tungsten oxide ultrafine particles and the composite tungsten oxide ultrafine particle dispersion liquid of example 7 were produced in the same manner as in example 1. The obtained ultrafine particles and the dispersion liquid thereof were evaluated in the same manner as in examples 1 to 6. The production conditions and the evaluation results are shown in Tables 1 and 2.

Further, the infrared shielding glass of example 7 was obtained and evaluated in the same manner as the infrared shielding glass of example 1 except that the composite tungsten oxide ultrafine particle dispersion liquid of example 7 was used. The results are shown in Table 3.

Example 8

The composite tungsten oxide ultrafine particles and the composite tungsten oxide ultrafine particle dispersion liquid of example 8 were produced in the same manner as in example 7 except that the carrier gas flow rate and the raw material feed rate were changed. Evaluations similar to those of examples 1 to 7 were performed for the obtained ultrafine particles and the dispersion liquid thereof. The production conditions and evaluation results are shown in Tables 1 and 2.

Further, the infrared shielding glass of example 8 was obtained and evaluated in the same manner as the infrared shielding glass of example 1, except that the composite tungsten oxide ultrafine particle dispersion liquid of example 8 was used. The results are shown in Table 3.

Example 9

0.148 kg of $Rb_2CO_3$ was dissolved in 0.330 kg of water, added to 1.000 kg of $H_2WO_4$, sufficiently stirred, and then dried to obtain a mixed powder of $Rb_{0.32}WO_3$ as a target composition.

The composite tungsten oxide ultrafine particles and the composite tungsten oxide ultrafine particle dispersion liquid of example 9 were produced in the same manner as in example 1, except that the mixed powder was used as the raw material to be charged into the high-frequency thermal plasma reactor. Evaluations similar to those of examples 1 to 8 were performed for the obtained ultrafine particles and the dispersion liquid thereof. The production conditions and evaluation results are shown in Tables 1 and 2.

Further, the infrared shielding glass of example 9 was obtained and evaluated in the same manner as the infrared shielding glass of example 1, except that the composite tungsten ultrafine particle dispersion liquid of example 9 was used. The results are shown in table 3.

Example 10

0.375 kg of $K_2CO_3$ was dissolved in 0.330 kg of water, added to 1.000 kg of $H_2WO_4$, sufficiently stirred, and then dried to obtain a mixed powder of $K_{0.27}WO_3$ as a target composition.

The composite tungsten oxide ultrafine particles and the composite tungsten oxide ultrafine particle dispersion liquid of example 10 were produced in the same manner as in example 1, except that the mixed powder was used as the raw material to be charged into the high-frequency thermal plasma reactor. Evaluations similar to those of examples 1 to 9 were performed for the obtained ultrafine particles and the dispersion liquid thereof. The production conditions and evaluation results are shown in Tables 1 and 2.

Further, the infrared shielding glass of example 10 was obtained and evaluated in the same manner as the infrared shielding glass of example 1, except that the composite tungsten oxide ultrafine particle dispersion liquid of example 10 was used. The results are shown in Table 3.

Example 11

0.320 kg of $TlCO_3$ was dissolved in 0.330 kg of water, added to 1.000 kg of $H_2WO_4$, sufficiently stirred, and then dried to obtain a mixed powder of $Tl_{0.19}WO_3$ as a target composition.

The composite tungsten oxide ultrafine particles and the composite tungsten oxide ultrafine particle dispersion liquid of example 11 were produced in the same manner as in example 1, except that the mixed powder was used as a raw material to be charged into the high-frequency thermal plasma reactor. Evaluations similar to those of examples 1 to 10 were performed for the obtained ultrafine particles and the dispersion liquid thereof. The production conditions and the evaluation results are shown in Tables 1 and 2.

Further, the infrared shielding glass of example 11 was obtained and evaluated in the same manner as in the infrared shielding glass of example 1, except that the composite tungsten oxide ultrafine particle dispersion liquid of example 11 was used. The results are shown in Table 3.

Example 12

0.111 kg of $BaCO_3$ was dissolved in 0.330 kg of water, added to 1.000 kg of $H_2WO_4$, sufficiently stirred, and then dried to obtain a mixed powder of $Ba_{0.14}WO_3$ as a target composition.

The composite tungsten oxide ultrafine particles and the composite tungsten oxide ultrafine particle dispersion liquid of example 12 were produced in the same manner as in example 1, except that the mixed powder was used as the raw material to be charged into the high-frequency thermal plasma reactor. Evaluations similar to those of examples 1 to 11 were performed for the obtained ultrafine particles and the dispersion liquid thereof. The production conditions and evaluation results are shown in Tables 1 and 2.

Further, the infrared shielding glass of example 12 was obtained and evaluated in the same manner as in the infrared shielding glass of example 1, except that the composite tungsten oxide ultrafine particle dispersion liquid of example 12 was used. The results are shown in Table 3.

Example 13

0.0663 kg of $K_2CO_3$ and 0.0978 kg of $Cs_2CO_3$ were dissolved in 0.330 kg of water, added to 1.000 kg of $H_2WO_4$, sufficiently stirred, and then dried to obtain a mixed powder of $K_{0.24}Cs_{0.15}WO_3$ as a target composition.

The composite tungsten oxide ultrafine particles and the composite tungsten oxide ultrafine particle dispersion liquid of example 13 were produced in the same manner as in example 1, except that the mixed powder was used as the raw material to be charged into the high-frequency thermal plasma reactor. Evaluations similar to those of examples 1 to 12 were performed for the obtained ultrafine particles and the dispersion liquid thereof. The production conditions and evaluation results are shown in Tables 1 and 2.

Further, the infrared shielding glass of example 13 was obtained and evaluated in the same manner as in the infrared shielding glass of example 1 except that the composite tungsten oxide ultrafine particle dispersion liquid of example 13 was used. The results are shown in Table 3.

Example 14

10.8 g of $Cs_2CO_3$ was dissolved in 16.5 g of water, the solution was added to 50 g of $H_2WO_4$, sufficiently stirred, and then dried. While feeding 2% $H_2$ gas with $N_2$ gas as a carrier, the dried product was heated, and fired at a temperature of 800° C. for 30 minutes. Thereafter, the composite tungsten oxide of example 14 were obtained by the solid-phase method of firing at 800° C. for 90 minutes under an $N_2$ gas atmosphere.

The composite tungsten oxide ultrafine particle dispersion liquid of example 14 was produced in the same manner as in example 1 except for the above. However, the pulverization and dispersion treatment time by the medium stirring mill was set to 4 hours. Evaluations similar to those of examples 1 to 13 were performed for the obtained ultrafine particles and the dispersion liquid thereof. The production conditions and evaluation results are shown in Tables 1 and 2.

Further, the infrared shielding glass of example 14 was obtained and evaluated in the same manner as the infrared shielding glass of example 1 except that the composite tungsten oxide ultrafine particle dispersion liquid of example 14 was used. The results are shown in Table 3.

Examples 15 to 24

0.044 kg of $Li_2CO_3$ was dissolved in 0.330 kg of water, added to 1.000 kg of $H_2WO_4$, sufficiently stirred, and then dried to obtain a mixed powder of $Li_{0.3}WO_3$ of example 15 as a target composition.

0.021 kg of $Na_2CO_3$ was dissolved in 0.330 kg of water, added to 1.000 kg of $H_2WO_4$, sufficiently stirred, and then dried to obtain a mixed powder of $Na_{0.1}WO_3$ of example 16 as a target composition.

0.251 kg of $Cu(NO_3)_2 \cdot 3H_2O$ was dissolved in 0.330 kg of water, added to 1.000 kg of $H_2WO_4$, sufficiently stirred, and then dried to obtain a mixed powder of $Cu_{0.26}WO_{2.72}$ of example 17 as a target composition.

0.005 kg of $Ag_2CO_3$ was dissolved in 0.330 kg of water, added to 1.000 kg of $H_2WO_4$, sufficiently stirred, and then dried to obtain a mixed powder of $Ag_{0.01}WO_3$ of example 18 as a target composition.

0.040 kg of $CaCO_3$ was dissolved in 0.330 kg of water, added to 1.000 kg of $H_2WO_4$, sufficiently stirred, and then dried to obtain a mixed powder of $Ca_{0.1}WO_3$ of example 19 as a target composition.

0.047 kg of $SrCO_3$ was dissolved in 0.330 kg of water, added to 1.000 kg of $H_2WO_4$, sufficiently stirred, and then dried to obtain a mixed powder of $Sr_{0.08}WO_3$ of example 20 as a target composition.

0.011 kg of $In_2O_3$ and 1.000 kg of $H_2WO_4$ were sufficiently mixed by a mash-crushing machine to obtain a mixed powder of $In_{0.02}WO_3$ of example 21 as a target composition.

0.115 kg of $SnO_2$ and 1.000 kg of $H_2WO_4$ were sufficiently mixed by the mash-crushing machine to obtain a mixed powder of $Sn_{0.19}WO_3$ of example 22 as a target composition.

0.150 kg of $Yb_2O_3$ and 1.000 kg of $H_2WO_4$ were sufficiently mixed by the mash-crushing machine to obtain a mixed powder of $Yb_{0.19}WO_3$ of example 23 as a target composition.

0.115 kg of Snowtex S manufactured by Nissan Chemical Industries. Ltd., and 1.000 kg of $H_2WO_4$ were sufficiently mixed by the mash-crushing machine to obtain a mixed powder of $Si_{0.043}WO_{2.839}$ of example 24 as a target composition. Note that Snowtex S is an ultrafine silica powder.

The composite tungsten oxide ultrafine particles and the composite tungsten oxide ultrafine particle dispersion liquid of examples 15 to 24 were produced in the same manner as in example 1 except that the mixed powder of examples 15 to 24 was used as the raw material to be charged into the high-frequency thermal plasma reactor. Evaluations similar to those of examples 1 to 14 were performed for the obtained ultrafine particles and the dispersion liquid thereof. The production conditions and evaluation results are shown in Tables 1 and 2.

Further, the infrared shielding glass of examples 15 to 24 was obtained and evaluated in the same manner as the infrared shielding glass of example 1 except that the composite tungsten oxide ultrafine particle dispersion liquid of examples 15 to 24 was used. The results are shown in Table 3.

Example 25

The composite tungsten oxide ultrafine particles were produced in the same manner as in example 1.

The composite tungsten oxide ultrafine particles were added to the polycarbonate resin which was thermoplastic resin, so that the visible light transmittance of the produced near infrared shielding ultrafine particle dispersion body was 70%, the dispersion body (1.0 mm thickness) being in the form of a sheet, to thereby prepare a composition for producing the near-infrared shielding ultrafine particle dispersion body.

The prepared composition for producing the near-infrared shielding ultrafine particle dispersion body was kneaded at 280° C. using a twin screw extruder, extruded from a T die, formed into a sheet material having a thickness of 1.0 mm by a calendar roll method, to thereby obtain the near-infrared shielding ultrafine particle dispersion body of example 25 in the form of a sheet.

When measuring the optical properties of the obtained near infrared shielding ultrafine particle dispersion body of example 25 in the form of a sheet, the visible light transmittance was 70%, the solar transmittance was 37.9%, and the haze was 0.7%.

Further, when estimating an amount of the composite tungsten oxide ultrafine particles contained in the obtained near infrared shielding ultrafine particle dispersion body in the form of a sheet from the mixing ratio of the composite tungsten oxide ultrafine particles and the polycarbonate resin, it was 0.29 mass %. The results are shown in Table 4.

Example 26

0.216 g of $Cs_2CO_3$ was dissolved in 0.330 g of water, the solution was added to 1.000 kg of $H_2WO_4$, sufficiently stirred, and then dried to obtain a dried product. While feeding 5% $H_2$ gas with $N_2$ gas as a carrier, the dried product was heated, and fired at a temperature of 800° C. for 1 hour. Thereafter, the solid-phase reaction method was performed for further firing the dried product at 800° C. in the $N_2$ gas atmosphere for 2 hours, to obtain the composite tungsten oxide of example 26.

20 parts by weight of the obtained composite tungsten oxide of example 26 and 80 parts by weight of water were mixed to prepare a slurry of about 3 kg. Note that no dispersant was added to this slurry. This slurry was charged into a medium stirring mill together with beads and subjected to pulverization and dispersion treatment for 4 hours. A horizontal cylindrical annular type (made by Ashizawa Co., Ltd.) was used as the medium stirring mill, and the inner wall of the vessel and the material of the rotor (rotary stirring part) were made of zirconia. Further, beads made of YSZ (Yttria-Stabilized Zirconia: yttria-stabilized zirconia) having a diameter of 0.1 mm were used for the beads. The pulverization and dispersion treatment was performed at a rotation speed of the rotor set to 14 rpm/sec, and a slurry flow rate set to 0.5 kg/min, to obtain an aqueous composite tungsten oxide ultrafine particle dispersion liquid of example 26.

When the dispersed particle size of each particle in the composite tungsten oxide ultrafine particle aqueous dispersion liquid of example 26 was measured, it was 70 nm. Note that as a setting of the dispersed particle size measurement, a particle refractive index was set to 1.81, and a particle shape was set as nonspherical. Further, a background was measured with water, and the solvent refractive index was set to 1.33.

Next, approximately 3 kg of the obtained composite tungsten oxide ultrafine particle dispersion liquid was dried in an air dryer, to obtain the composite tungsten oxide ultrafine particles of example 26. Note that for the air dryer, a thermostatic oven (SPH-201 type manufactured by Espec Corporation) was used, a drying temperature was set to 70° C., and a drying time was set to 96 hours.

The X-ray diffraction pattern of the composite tungsten oxide ultrafine particles of example 26 was measured and a phase was identified, and as a result, the obtained ultrafine particles were identified as having a hexagonal $Cs_{0.33}WO_3$ single phase. Further, in the X-ray diffraction pattern of the obtained ultrafine particles, the peak top intensity was 4200 counts, the peak position was $2\theta=27.8°$, and the crystallite size was 23.7 nm. On the other hand, when a silicon powder standard sample (manufactured by NIST, 640c) was prepared and a value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.21 after the pulverization and dispersion treatment of example 26, when the value of the peak intensity of the standard sample was set to 1.

The composition of the obtained composite tungsten oxide ultrafine particles of example 26 was examined by ICP emission spectrometry. As a result, Cs concentration was 15.2 mass %, W concentration was 64.6 mass %, and the molar ratio of Cs/W was 0.33. It was confirmed that a balance other than Cs and W was oxygen and no other impurity element contained by 1 mass % or more was present.

When the BET specific surface area of the composite tungsten oxide ultrafine particles of example 26 obtained by pulverization was measured, it was 42.6 m$^2$/g.

Further, when the content of the volatile component of the composite tungsten oxide ultrafine particles of example 26 was measured, it was 2.2 mass %.

20 parts by weight of the obtained composite tungsten oxide ultrafine particles were dispersed in 64 parts by weight of methyl isobutyl ketone as a solvent and 16 parts by weight of dispersant a, to obtain 50 g of the dispersion liquid, and when the dispersed particle size of each particle in the dispersion liquid was measured, it was 80 nm. Note that as a setting of the particle size measurement, the particle refractive index was set to 1.81, and the particle shape was set as nonspherical. Further, the measurement was performed using methyl isobutyl ketone and the solvent refractive index was set to 1.40.

The composite tungsten oxide ultrafine particle dispersion liquid of example 26 was mixed with ultraviolet curing resin and methyl isobutyl ketone as a solvent, to thereby obtain a coating liquid. The surface of the glass substrate having a thickness of 3 mm was coated with the coating liquid using a bar coater (IMC-700, manufactured by Imoto Seisakusho) to thereby form a coating layer. After the solvent was evaporated from the coating layer, it was irradiated with ultraviolet rays and cured to form a coating layer, to thereby obtain the infrared shielding glass of example 26. At this time, the concentration of the coating liquid was previously adjusted when diluting the solvent with methyl isobutyl ketone as described above so that the visible light transmittance of the infrared shielding glass was 70%.

When the average particle size of the composite tungsten oxide ultrafine particles dispersed in the obtained infrared shielding glass of example 26 was calculated by an image processing device in which a transmission electron microscope image was used, it was 23 nm, which was approximately the same as the above-described crystallite size of 23.7 nm.

Further, when the haze of the obtained infrared shielding glass of example 26 was measured based on JIS K 7105 using a haze meter (HM-150 manufactured by Murakami Color Research Laboratory), it was 0.3%. Further, when the transmittance of the obtained infrared shielding glass of example 26 was measured at intervals of 5 nm in a wavelength range of 200 nm to 2600 nm by a spectrophotometer (U-4100 manufactured by Hitachi, Ltd.), a transmission profile shown in FIG. 3 was obtained. When the solar radiation transmittance was determined from the obtained transmission profile, it was 35.7%. Further, when the infrared shielding glass of example 26 was irradiated with a pseudo sunlight using an artificial sunlight to visually check the presence or absence of the Blue Haze phenomenon, it was confirmed that no blue haze occurred.

Here, a composition for producing the near-infrared shielding ultrafine particle dispersion body of example 26 in the form of a sheet was prepared in the same manner as in example 25, using the composite tungsten oxide ultrafine particles of example 26, to thereby produce the near-infrared shielding ultrafine particle dispersion body in the form of a sheet. Evaluation similar to that of example 25 was performed for the obtained near-infrared shielding ultrafine particle dispersion body in the form of a sheet. The results are shown in Table 4.

Example 27

The composite tungsten oxide ultrafine particles, the ultrafine particle dispersion liquid thereof, the infrared shielding glass, and the near-infrared shielding ultrafine particle dispersion body in the form of a sheet of example 27 were produced in the same manner as in example 26 except that the drying treatment by the air dryer was changed to a vacuum drying treatment by a vacuum stirring mash-crushing machine.

Note that an Ishikawa type stirring mash-crushing machine 24P type (manufactured by Tajima Kagaku Kikai Co., Ltd.) was used as the vacuum stirring mash-crushing machine, and the drying temperature at the time of the vacuum drying treatment was set to 80° C., the drying time was set to 32 hours, the rotation frequency of the kneading mixer was set to 40 Hz, and a pressure in a vacuum container was set to 0.001 MPa or less.

Evaluations similar to those of example 26 were performed for the obtained composite tungsten oxide ultrafine particles, the dispersion liquid thereof, the infrared shielding glass, and the near-infrared shielding ultrafine particle dispersion body of example 27. The production conditions and the evaluation results are shown in Tables 1, 2, 3, and 4.

Example 28

The composite tungsten oxide ultrafine particles and the ultrafine particle dispersion liquid thereof according to example 28 were produced in the same manner as in example 26 except that the drying treatment by the air dryer was changed to a spray drying treatment by a spray dryer.

A spray dryer ODL-20 type (manufactured by Ohkawara Kakohki Co., Ltd.) was used as the spray dryer. Evaluations similar to those of example 26 were performed for the composite tungsten oxide ultrafine particles, the dispersion liquid thereof, the infrared shielding glass, and the near-infrared shielding ultrafine particle dispersion body in the form of a sheet of example 28. The production conditions and the evaluation results are shown in Tables 1, 2, 3, and 4.

Example 29 to 31

The composite tungsten oxide ultrafine particles and the ultrafine particle dispersion liquid thereof according to examples 29 to 31 were produced in the same manner as in examples 26 to 28 except that the pulverization and dispersion treatment time by the medium stirring mill was changed to 2 hours. However, the pulverization and dispersion treatment time by the medium stirring mill was set to 2 hours. Evaluations similar to those of examples 26 were performed for the obtained ultrafine particles, the infrared shielding glass, and the near-infrared shielding ultrafine particle dispersion body in the form of a sheet. The production conditions and evaluation results are shown in Tables 1, 2, 3, and 4.

Example 32 to 34

The composite tungsten oxide ultrafine particles and the ultrafine particle dispersion liquid thereof according to examples 32 to 34 were produced by the same synthetic producing method as in the above-described examples 29 to 31, except that 20 parts by weight of the composite tungsten oxide and 80 parts by weight of propylene glycol monoethyl ether were mixed in preparing the composite tungsten oxide ultrafine particle dispersion liquid. Evaluations similar to those of examples 26 were performed for the obtained ultrafine particles, the ultrafine particle dispersion liquid thereof, the infrared shielding glass, and the near-infrared shielding ultrafine particle dispersion body in the form of a sheet. The production conditions and evaluation results are shown in Tables 1, 2, 3, and 4.

Example 35

The composite tungsten oxide ultrafine particles were obtained in the same manner as in example 1. Thereafter, 20 parts by weight of the obtained ultrafine particles, 64 parts by weight of methyl isobutyl ketone, and 16 parts by weight of dispersant a were mixed to prepare 50 g of slurry. The slurry was subjected to dispersion treatment for 1 hour with an ultrasonic homogenizer (US-600TCVP, manufactured by Nippon Seiki Seisakusho Co., Ltd.) to obtain the composite tungsten oxide ultrafine particle dispersion liquid of example 35 and further produce the infrared shielding glass of example 35. Evaluations similar to those of examples 1 were performed for the composite tungsten oxide ultrafine particle dispersion liquid of example 35 and the infrared shielding glass of example 35. The production conditions and the evaluation results are shown in Table 1, 2, 3, and 4.

Comparative Examples 1 and 2

The composite tungsten oxide ultrafine particles and the composite tungsten oxide ultrafine particle dispersion liquid of comparative examples 1 and 2 were produced in the same manner as in example 1 except that the carrier gas flow rate, the plasma gas flow rate, the sheath gas flow rate, and the raw material feed rate were changed. Table 1 shows the changed carrier gas flow rate condition, raw material feed rate condition, and other conditions. Evaluations similar to those of examples 1 were performed for the obtained ultrafine particles and the dispersion liquid thereof. The evaluation results are shown in Table 2.

Further, the infrared shielding glass of comparative examples 1 and 2 was obtained and evaluated in the same manner as the infrared shielding glass of example 1, except that the composite tungsten oxide ultrafine particle dispersion liquid of comparative examples 1 and 2 was used. The results are shown in Table 3.

Comparative Examples 3

The composite tungsten oxide ultrafine particles and the composite tungsten oxide ultrafine particle dispersion liquid of comparative example 3 were produced in the same manner as in example 1, except that in order to generate a thermal plasma having a high temperature part of 5000 to 10000 K, the high-frequency power was set to 15 KW. Evaluations similar to those of examples 1 and comparative examples 1 and 2 were performed for the obtained ultrafine particles and the dispersion liquid thereof. The evaluation results are shown in Tables 1 and 2.

Further, the infrared shielding glass of comparative examples 1 and 2 was obtained and evaluated in the same manner as the infrared shielding glass of example 1, except that the composite tungsten oxide ultrafine particle dispersion liquid of comparative examples 1 and 2 was used. The results are shown in Table 3.

Comparative Examples 4

The composite tungsten oxide ultrafine particle aqueous dispersion liquid of comparative example 4 was obtained in the same manner as in example 26, except that the composite tungsten oxide ultrafine particle aqueous dispersion liquid of example 26 was obtained by pulverization and dispersion treatment for 40 hours instead of 4 hours. When the dispersed particle size of the composite tungsten oxide ultrafine particle aqueous dispersion liquid of comparative example 4 was measured, it was 120 nm. Note that as the setting of the dispersed particle size measurement, the particle refractive index was set to 1.81, and the particle shape was set as nonspherical. Further, the background was measured with water, and the solvent refractive index was set to 1.33.

The X-ray diffraction pattern of the composite tungsten oxide ultrafine particles of comparative example 4 was measured and a phase was identified, and as a result, the obtained ultrafine particles were identified as having a hexagonal $Cs_{0.33}WO_3$ single phase. Further, the peak top intensity of the X-ray diffraction pattern of the obtained ultrafine particles was 1,300 counts, the peak position was $2\theta=27.8°$, and the crystallite size was 8.1 nm. On the other hand, when the silicon powder standard sample (manufactured by NIST, 640c) was prepared and the value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.07 after the pulverization and dispersion treatment of example 1, when the value of the peak intensity of the standard sample was set to 1.

When the BET specific surface area of the composite tungsten oxide ultrafine particles of comparative example 4 obtained by pulverization was measured, it was 102.8 m²/g.

Further, when the content of the volatile component of the composite tungsten oxide ultrafine particles of comparative example 4 was measured, it was 2.2 mass %.

20 parts by weight of the obtained composite tungsten oxide ultrafine particles were dispersed in 64 parts by weight of methyl isobutyl ketone and 16 parts by weight of dispersant a, to obtain 50 g of the composite tungsten oxide ultrafine particle dispersion liquid of comparative example 4. Then, when the dispersed particle size of the composite tungsten oxide ultrafine particle dispersion liquid was measured, it was 120 nm. Note that as the setting of the dispersed particle size measurement, the particle refractive index was set to 1.81, and the particle shape was set as nonspherical. Note that the background was measured with methyl isobutyl ketone, and the solvent refractive index was set to 1.40.

The composite tungsten oxide ultrafine particle dispersion liquid of comparative example 4 was mixed with ultraviolet curing resin and methyl isobutyl ketone as a solvent to prepare a coating liquid. The surface of the glass substrate having a thickness of 3 mm was coated with the coating liquid using a bar coater to form a coating layer. After the solvent was evaporated from the coating layer, the coating layer was irradiated with ultraviolet rays and cured and a coating layer is obtained, to thereby obtain the infrared shielding glass of comparative example 4. At this time, the concentration of the dispersion liquid was adjusted by diluting the solvent with methyl isobutyl ketone in advance so that the cured layer had a visible light transmittance of 70%.

When the average particle size of the composite tungsten oxide ultrafine particles dispersed in the obtained infrared shielding glass of comparative example 4 was calculated by an image processing device using a transmission electron microscope image, it was 120 nm.

When the haze of the obtained infrared shielding glass of comparative example 4 was measured, it was 1.8%. Further, when the transmittance of the obtained cured layer of comparative example 4 was measured at intervals of 5 nm in the wavelength range of 200 nm to 2600 nm to obtain the solar radiation transmittance from the obtained transmission profile, it was 48.3%. Further, the presence or absence of the blue haze phenomenon of the infrared shielding glass of comparative example 4 was visually confirmed in the same manner as in example 1, and it was confirmed that there was the blue haze phenomenon.

The results are shown in Table 3.

Example 36

The composite tungsten oxide ultrafine particle dispersion liquid of example 1 was added to polyvinyl butyral, and triethylene glycol-di-2-ethyl butyrate as a plasticizer was added thereto so that a weight ratio [polyvinyl butyral/plasticizer]=100/40. At this time, the concentration of the composite tungsten oxide ultrafine particles was adjusted in order to obtain the visible light transmittance of 70% of the infrared shielding laminated structure (which may be described as a "laminated structure" in this example and the comparative example) which is an object to be produced. Methyl butyl ketone which is a low boiling point solvent in the obtained liquid was removed to prepare a composition for an intermediate film having a polyvinyl butyral concentration of 71 mass %.

The prepared composition for the intermediate film was kneaded with a roll and formed into a 0.76 mm thickness sheet to prepare a solar radiation shielding intermediate film of example 36. The prepared solar radiation shielding intermediate film was sandwiched between two green glass substrates of 100 mm×100 mm×about 2 mm thickness, and after preliminarily adhering by heating at 80° C., it was placed in an autoclave at 140° C. and 14 kg/cm², and main adhering was performed to thereby prepare a laminated structure A of example 36.

When the average particle size of each composite tungsten oxide ultrafine particle dispersed in the obtained laminated structure A of example 36 was calculated by an image processing device in which a transmission electron microscopic image was used, it was 17 nm. Further, when the haze of the obtained laminated structure A was measured according to JIS K 7105 using a haze meter (HM-150, manufactured by Murakami Color Research Laboratory), it was 0.8%. Further, when the transmittance of the obtained laminated structure A of example 36 was measured at interval of 5 nm in a wavelength range of 200 nm to 2600 nm using a spectrophotometer (U-4100, manufactured by Hitachi, Ltd.), the solar radiation transmittance was 34.4% when the visible light transmittance was 70%. The evaluation results are shown in Table 4. Further, the laminated structure A of example 1 was irradiated with a pseudo sunlight using an artificial sunlight lamp (XC-100, manufactured by Celic Corporation), and the presence or absence of the blue haze phenomenon was visually confirmed. As a result, it was confirmed that there was no blue haze phenomenon.

Examples 37 to 39

A laminated structure B of example 37 was produced in the same manner as in example 36 except that one of the two green glasses was replaced with polycarbonate. Further, a laminated structure C of example 38 was produced in the same manner as in example 36 except that one of the two green glasses was replaced with a clear glass. Further, a laminated structure C' of example 39 was produced in the same manner as in example 36 except that two green glasses were replaced by two clear glasses.

Optical measurements similar to those of example 36 were performed for the obtained laminated structures B, C, and C' of examples 37 to 39. The measurement results are shown in Table 5.

Examples 40 to 62

The composite tungsten oxide ultrafine particle dispersion liquid of examples 2 to 24 was used, and the composition for the intermediate film of examples 40 to 62 was prepared in the same manner as in example 36, to thereby further prepare laminated structures D to Z of examples 40 to 62.

Optical measurements similar to those of example 36 were performed for the obtained laminated structures D to Z of examples 40 to 62. The measurement results are shown in Table 5.

Example 63

The composite tungsten oxide ultrafine particle dispersion liquid of example 1 was added to polyvinyl butyral, and triethylene glycol-di-2-ethyl butyrate as a plasticizer was added thereto so that a weight ratio [polyvinyl butyral/plasticizer]=100/40, to thereby prepare the composite tungsten oxide ultrafine particle dispersion liquid of example 63.

At this time, the concentration of the composite tungsten oxide ultrafine particles was adjusted in order to obtain the visible light transmittance of 70% in the laminated structure which is an object to be produced, to thereby prepare the composition for the intermediate film having a polyvinyl butyral concentration of 71 mass %.

The prepared composition for the intermediate film was kneaded with a roll and formed into a 0.76 mm thickness sheet to prepare a solar radiation shielding intermediate film of example 63. The prepared solar radiation shielding intermediate film was sandwiched between two green glass substrates of 100 mm×100 mm×about 2 mm thickness, and after preliminarily adhering by heating at 80° C., it was placed in an autoclave at 140° C. and 14 kg/cm$^2$, and main adhering was performed to thereby prepare a laminated structure a of example 63.

Optical measurements similar to those of example 36 were performed for the obtained laminated structures a. The measurement results are shown in Table 5.

Example 64

20 parts by weight of the composite tungsten oxide ultrafine particles of example 26 were dispersed in 64 parts by weight of methyl isobutyl ketone as a dispersion medium and 16 parts by weight of dispersant a, to thereby obtain 50 g of the composite tungsten oxide ultrafine particle dispersion liquid of example 64.

When the dispersed particle size of the composite tungsten oxide ultrafine particle dispersion liquid of example 64 was measured, it was 80 nm. Note that as a setting of a particle size measurement, a particle refractive index was set to 1.81, and a particle shape was set as nonspherical. Further, a background was measured using methyl isobutyl ketone and a solvent refractive index was set to 1.40.

The composite tungsten oxide ultrafine particle dispersion liquid of example 64 was added to polyvinyl butyral, and triethylene glycol-di-2-ethyl butyrate as a plasticizer was added thereto so that a weight ratio [polyvinyl butyral/plasticizer]=100/40. At this time, the concentration of the composite tungsten oxide ultrafine particles was adjusted in order to obtain the visible light transmittance of 70% in the laminated structure which is an object to be produced, and methyl butyl ketone which is a low boiling point solvent in the obtained liquid was removed, to thereby prepare the composition for the intermediate film having a polyvinyl butyral concentration of 71 mass %.

The prepared composition was kneaded with a roll and formed into a 0.76 mm thickness sheet to prepare the solar radiation shielding intermediate film of example 64. The prepared solar radiation shielding intermediate film was sandwiched between two green glass substrates of 100 mm×100 mm×about 2 mm thickness, and after preliminarily adhering by heating at 80° C., it was placed in an autoclave at 140° C. and 14 kg/cm$^2$, and main adhering was performed to thereby prepare a laminated structure b of example 64.

Optical measurements similar to those of example 36 were performed for the obtained laminated structures b. The measurement results are shown in Table 5.

Examples 65 to 72

The composite tungsten oxide ultrafine particle dispersion liquid, the composition for the intermediate film, the solar radiation shielding intermediate film, and laminated structures c to j of examples 65 to 72 were produced in the same manner as in example 64, except that the composite tungsten oxide ultrafine particles of examples 27 to 34 were used. Measurements similar to those of example 36 were performed for the obtained ultrafine particles, the dispersion liquid thereof, and the laminated structures c to j. The measurement results are shown in Table 5.

When the dispersed particle size of each particle in the composite tungsten oxide ultrafine particle dispersion liquid of examples 65 to 72 was measured and, it was 80 nm.

Example 73

20 parts by weight of the composite tungsten oxide ultrafine particles used in example 1, 64 parts by weight of methyl isobutyl ketone, and 16 parts by weight of dispersant a were mixed to prepare 50 g of slurry. The obtained slurry was subjected to dispersion treatment for 1 hour using an ultrasonic homogenizer (US-600TCVP, manufactured by Nippon Seiki Seisakusho Co., Ltd.) to thereby obtain the composite tungsten oxide ultrafine particle dispersion liquid of example 73.

The composition for the intermediate film and the solar radiation shielding intermediate film and a laminated structure k were produced in the same manner as in example 36, except that the obtained composite tungsten oxide ultrafine particle dispersion liquid of example 73 was used. The measurement results are shown in Table 5.

Note that when the dispersed particle size of each particle in the composite tungsten oxide ultrafine particle dispersion liquid of example 73 was measured, it was 70 nm.

Comparative Examples 5 to 7

The composite tungsten oxide ultrafine particle dispersion liquid, the composition for an intermediate film, and the solar radiation shielding intermediate film, and laminated structures AA to AC of comparative examples 5 to 7 were produced in the same manner as in example 64, except that the composite tungsten oxide ultrafine particles of comparative examples 1 to 3 were used. Evaluations similar to those of example 36 were performed for the obtained ultrafine particles, the dispersion liquid thereof, and the laminated structures AA to AC. The measurement results are shown in Table 5.

Note that when the dispersed particle size of each particle in the composite tungsten oxide ultrafine particle dispersion liquid of comparative examples 5 to 7 was measured, it was 80 nm in each case. When the dispersed particle size of each particle in the composite tungsten oxide ultrafine particle dispersion liquid of comparative example 5 was measured in the same manner as in comparative example 4, it was also 80 nm.

CONCLUSION

As is apparent from Table 2, the composite tungsten oxide ultrafine particles contained in the dispersion body which is the coating layer of the infrared shielding glass of examples 1 to 35, and the composite tungsten oxide ultrafine particles contained in the solar radiation shielding intermediate film of the infrared shielding laminated structure of examples 36 to 73, were the composite tungsten oxide ultrafine particles in which the ratio of the XRD peak top intensity of the composite tungsten oxide ultrafine particles was 0.13 or more, with plane (220) of a silicon powder standard sample (640c produced by NIST) as a reference, and the crystallite size was 1 nm or more. Here, in the example, the average particle size and crystallite size of each composite tungsten oxide ultrafine particle in the dispersion body and in the solar radiation shielding intermediate film were almost the same value, and therefore the used composite tungsten oxide ultrafine particles are considered to be single crystal composite tungsten oxide ultrafine particles having 50% or less volume ratio of an amorphous phase.

On the other hand, in comparative examples 1, 2 and 4 to 6, it is considered that the average particle size of the composite tungsten oxide ultrafine particles in the dispersion body or in the solar radiation shielding intermediate film is larger than the crystallite size and not a single crystal. Further, in comparative examples 3 and 7, hetero phases ($WO_2$ and W) were generated.

Then, the infrared shielding glass, the near infrared shielding ultrafine particle dispersion body, and the infrared shielding laminated structure produced by using the composite tungsten oxide ultrafine particles of the example, exhibited excellent near infrared shielding properties with a solar transmittance of 47% or less as shown in Tables 3 to 5.

TABLE 1

| | | Firing condition | | | | | |
|---|---|---|---|---|---|---|---|
| | | Thermal plasma method | | | | | |
| | Raw material | Plasma temperature [K] | High-frequency power [kW] | Carrier gas (Ar) (L/min) | Plasma gas (Ar) (L/min) | Sheath gas (L/min) | *1 (g/min) |
| Example 1 | $Cs_2CO_3$&$H_2WO_4$ | 10000~15000 | 40 | 9 | 30 | Ar55 He5 | 50 |
| Example 2 | $Cs_2CO_3$&$H_2WO_4$ | 10000~15000 | 40 | 8 | 30 | Ar55 He5 | 25 |
| Example 3 | $Cs_2CO_3$&$H_2WO_4$ | 10000~15000 | 40 | 6 | 30 | Ar55 He5 | 25 |
| Example 4 | $Cs_2CO_3$&$H_2WO_4$ | 10000~15000 | 40 | 9 | 45 | Ar55 He5 | 50 |
| Example 5 | $Cs_2CO_3$&$H_2WO_4$ | 10000~15000 | 40 | 9 | 30 | Ar55 He5 | 50 |
| Example 6 | $Cs_2CO_3$&$H_2WO_4$ | 10000~15000 | 40 | 6 | 45 | Ar55 He5 | 25 |
| Example 7 | $Cs_{0.33}WO_3$ | 10000~15000 | 40 | 9 | 30 | Ar55 He5 | 50 |
| Example 8 | $Cs_{0.33}WO_3$ | 10000~15000 | 40 | 6 | 30 | Ar55 He5 | 25 |
| Example 9 | $Rb_2CO_3$&$H_2WO_4$ | 10000~15000 | 40 | 9 | 30 | Ar55 He5 | 50 |
| Example 10 | $K_2CO_3$&$H_2WO_4$ | 10000~15000 | 40 | 9 | 30 | Ar55 He5 | 50 |
| Example 11 | $TlNO_3$&$H_2WO_4$ | 10000~15000 | 40 | 9 | 30 | Ar55 He5 | 50 |
| Example 12 | $BaCO_3$&$H_2WO_4$ | 10000~15000 | 40 | 9 | 30 | Ar55 He5 | 50 |
| Example 13 | $K_2CO_3$&$Cs_2CO_3$&$H_2WO_4$ | 10000~15000 | 40 | 9 | 30 | Ar55 He5 | 50 |
| Example 14 | $Cs_2CO_3$&$H_2WO_4$ | | | | | — | |
| Example 15 | $Li_2CO_3$&$H_2WO_4$ | 10000~15000 | 40 | 9 | 30 | Ar55 He5 | 50 |
| Example 16 | $Na_2CO_3$&$H_2WO_4$ | 10000~15000 | 40 | 9 | 30 | Ar55 He5 | 50 |
| Example 17 | $Cu(NO_3)_2 \cdot 3H_2O$&$H_2WO_4$ | 10000~15000 | 40 | 9 | 30 | Ar55 He5 | 50 |
| Example 18 | $Ag_2CO_3$&$H_2WO_4$ | 10000~15000 | 40 | 9 | 30 | Ar55 He5 | 50 |
| Example 19 | $CaCO_3$&$H_2WO_4$ | 10000~15000 | 40 | 9 | 30 | Ar55 He5 | 50 |
| Example 20 | $SrCO_3$&$H_2WO_4$ | 10000~15000 | 40 | 9 | 30 | Ar55 He5 | 50 |
| Example 21 | $In_2O_3$&$H_2WO_4$ | 10000~15000 | 40 | 9 | 30 | Ar55 He5 | 50 |
| Example 22 | $SnO_2$&$H_2WO_4$ | 10000~15000 | 40 | 9 | 30 | Ar55 He5 | 50 |
| Example 23 | $Yb_2O_3$&$H_2WO_4$ | 10000~15000 | 40 | 9 | 30 | Ar55 He5 | 50 |
| Example 24 | SnowtexS&$H_2WO_4$ | 10000~15000 | 40 | 9 | 30 | Ar55 He5 | 50 |
| Example 25 | | Same as example 1 | | | | | |
| Example 26 | $Cs_2CO_3$&$H_2WO_4$ | | | | | — | |
| Example 27 | $Cs_2CO_3$&$H_2WO_4$ | | | | | — | |
| Example 28 | $Cs_2CO_3$&$H_2WO_4$ | | | | | — | |
| Example 29 | $Cs_2CO_3$&$H_2WO_4$ | | | | | — | |
| Example 30 | $Cs_2CO_3$&$H_2WO4$ | | | | | — | |
| Example 31 | $Cs_2CO_3$&$H_2WO_4$ | | | | | — | |
| Example 32 | $Cs_2CO_3$&$H_2WO_4$ | | | | | — | |
| Example 33 | $Cs_2CO_3$&$H_2WO_4$ | | | | | — | |
| Example 34 | $Cs_2CO_3$&$H_2WO_4$ | | | | | — | |

TABLE 1-continued

| | | | | | | | | |
|---|---|---|---|---|---|---|---|---|
| Example 35 | | Same as example 1 | | | | | | |
| Comparative example 1 | Cs$_2$CO$_3$&H$_2$WO$_4$ | 10000~15000 | 40 | 3 | 30 | Ar55 He5 | 15 | |
| Comparative example 2 | Cs$_2$CO$_3$&H$_2$WO$_4$ | 10000~15000 | 40 | 9 | 15 | Ar55 He5 | 50 | |
| Comparative example 3 | Cs$_2$CO$_3$&H$_2$WO$_4$ | 5000~10000 | 15 | 9 | 30 | Ar55 He5 | 50 | |
| Comparative example 4 | Cs$_2$CO$_3$&H$_2$WO$_4$ | — | | | | | | |

| | Firing condition Solid phase reaction method | | | Pulverization and dispersion condition | | |
|---|---|---|---|---|---|---|
| | *2 [° C.] | In-furnace gas | Firing time | Solvent | *3 (hr) | Drying treatment device |
| Example 1 | | — | | MIBK | 1 | — |
| Example 2 | | — | | MIBK | 1 | — |
| Example 3 | | — | | MIBK | 1 | — |
| Example 4 | | — | | MIBK | 1 | — |
| Example 5 | | — | | MIBK | 1 | — |
| Example 6 | | — | | MIBK | 1 | — |
| Example 7 | | — | | MIBK | 1 | — |
| Example 8 | | — | | MIBK | 1 | — |
| Example 9 | | — | | MIBK | 1 | — |
| Example 10 | | — | | MIBK | 1 | — |
| Example 11 | | — | | MIBK | 1 | — |
| Example 12 | | — | | MIBK | 1 | — |
| Example 13 | | — | | MIBK | 1 | — |
| Example 14 | 800 800 | N$_2$ carrier, 2% H$_2$ N$_2$ atmosphere | 30 min 90 min | MIBK | 4 | — |
| Example 15 | | — | | MIBK | 1 | — |
| Example 16 | | — | | MIBK | 1 | — |
| Example 17 | | — | | MIBK | 1 | — |
| Example 18 | | — | | MIBK | 1 | — |
| Example 19 | | — | | MIBK | 1 | — |
| Example 20 | | — | | MIBK | 1 | — |
| Example 21 | | — | | MIBK | 1 | — |
| Example 22 | | — | | MIBK | 1 | — |
| Example 23 | | — | | MIBK | 1 | — |
| Example 24 | | — | | MIBK | 1 | — |
| Example 25 | | Same as example 1 | | | | |
| Example 26 | 800 800 | N$_2$ carrier, 5% H$_2$ N$_2$ atmosphere | 1 hr 2 hr | Water | 4 | Air dryer |
| Example 27 | 800 800 | N$_2$ carrier, 5% H$_2$ N$_2$ atmosphere | 1 hr 2 hr | Water | 4 | Ishikawa type stirring type mash-crushing machine |
| Example 28 | 800 800 | N$_2$ carrier, 5% H$_2$ N$_2$ atmosphere | 1 hr 2 hr | Water | 4 | Spray dryer |
| Example 29 | 800 800 | N$_2$ carrier, 5% H$_2$ N$_2$ atmosphere | 1 hr 2 hr | Water | 2 | Air dryer |
| Example 30 | 800 800 | N$_2$ carrier, 5% H$_2$ N$_2$ atmosphere | 1 hr 2 hr | Water | 2 | Ishikawa type stirring type mash-crushing machine |
| Example 31 | 800 800 | N$_2$ carrier, 5% H$_2$ N$_2$ atmosphere | 1 hr 2 hr | Water | 2 | Spray dryer |
| Example 32 | 800 800 | N$_2$ carrier, 5% H$_2$ N$_2$ atmosphere | 1 hr 2 hr | *4 | 2 | Air dryer |
| Example 33 | 800 800 | N$_2$ carrier, 5% H$_2$ N$_2$ atmosphere | 1 hr 2 hr | *4 | 2 | Ishikawa type stirring type mash-crushing machine |
| Example 34 | 800 800 | N$_2$ carrier, 5% H$_2$ N$_2$ atmosphere | 1 hr 2 hr | *4 | 2 | Spray dryer |
| Example 35 | | Same as example 1 | | MIBK | 1 * | — |
| Comparative example 1 | | — | | MIBK | 1 | — |
| Comparative example 2 | | — | | MIBK | 1 | — |
| Comparative example 3 | | — | | MIBK | 1 | — |
| Comparative example 4 | 800 800 | N$_2$ carrier, 5% H$_2$ N$_2$ atmosphere | 1 hr 2 hr | Water | 40 | Air dryer |

Wherein 1* ultrasonic homogenizer 1 hr
*1 Raw material feed rate
*2 In-furnace temperature
*3 Pulverization and dispersion treatment time
*4 Propylene glycol monomethyl ether

TABLE 2

| | Crystal structure | Hetero phase | Peak top intensity *1 (count) | Peak top intensity After dispersion (count) | Peak intensity of plane (220) of standard sample | Peak top intensity ratio |
|---|---|---|---|---|---|---|
| Example 1 | Hexagonal crystal structure | Absent | 4200 | 3000 | 19800 | 0.15 |
| Example 2 | Hexagonal crystal structure | Absent | 4700 | 3400 | 19800 | 0.17 |
| Example 3 | Hexagonal crystal structure | Absent | 5400 | 4200 | 19800 | 0.21 |
| Example 4 | Hexagonal crystal structure | Absent | 4500 | 3100 | 19800 | 0.16 |
| Example 5 | Hexagonal crystal structure | Absent | 4400 | 3100 | 19800 | 0.16 |
| Example 6 | Hexagonal crystal structure | Absent | 5800 | 4500 | 19800 | 0.23 |
| Example 7 | Hexagonal crystal structure | Absent | 5200 | 4000 | 19800 | 0.20 |
| Example 8 | Hexagonal crystal structure | Absent | 5700 | 4400 | 19800 | 0.22 |
| Example 9 | Hexagonal crystal structure | Absent | 4000 | 3000 | 19800 | 0.15 |
| Example 10 | Hexagonal crystal structure | Absent | 3800 | 2900 | 19800 | 0.15 |
| Example 11 | Hexagonal crystal structure | Absent | 4000 | 2900 | 19800 | 0.15 |
| Example 12 | Hexagonal crystal structure | Absent | 4200 | 3100 | 19800 | 0.16 |
| Example 13 | Hexagonal crystal structure | Absent | 4000 | 3200 | 19800 | 0.16 |
| Example 14 | Hexagonal crystal structure | Absent | 22000 | 4200 | 19800 | 0.21 |
| Example 15 | Cubic crystal structure | Absent | 3600 | 2600 | 19800 | 0.13 |
| Example 16 | Tetragonal crystal structure | Absent | 3600 | 2600 | 19800 | 0.13 |
| Example 17 | Monocline | Absent | 3700 | 2700 | 19800 | 0.14 |
| Example 18 | Orthorhombic crystal structure | Absent | 4100 | 3200 | 19800 | 0.16 |
| Example 19 | Tetragonal crystal structure | Absent | 4000 | 3100 | 19800 | 0.16 |
| Example 20 | Tetragonal crystal structure | Absent | 4100 | 3100 | 19800 | 0.16 |
| Example 21 | Tetragonal crystal structure | Absent | 4100 | 3200 | 19800 | 0.16 |
| Example 22 | Tetragonal crystal structure | Absent | 4200 | 3100 | 19800 | 0.16 |
| Example 23 | Cubic crystal structure | Absent | 4400 | 3400 | 19800 | 0.17 |
| Example 24 | Monocline | Absent | 4000 | 3100 | 19800 | 0.16 |
| Example 25 | The same as example 1 | | | | | |
| Example 26 | Hexagonal crystal structure | Absent | 4200 | 4200 | 19800 | 0.21 |
| Example 27 | Hexagonal crystal structure | Absent | 4200 | 4200 | 19800 | 0.21 |
| Example 28 | Hexagonal crystal structure | Absent | 4100 | 4100 | 19800 | 0.21 |
| Example 29 | Hexagonal crystal structure | Absent | 6200 | 6200 | 19800 | 0.31 |
| Example 30 | Hexagonal crystal structure | Absent | 5900 | 5900 | 19800 | 0.30 |
| Example 31 | Hexagonal crystal structure | Absent | 6000 | 6000 | 19800 | 0.30 |
| Example 32 | Hexagonal crystal structure | Absent | 5500 | 5500 | 19800 | 0.28 |
| Example 33 | Hexagonal crystal structure | Absent | 5400 | 5400 | 19800 | 0.27 |
| Example 34 | Hexagonal crystal structure | Absent | 5300 | 5300 | 19800 | 0.27 |
| Example 35 | Hexagonal crystal structure | Absent | 4200 | 4200 | 19800 | 0.21 |
| Comparative example 1 | Hexagonal crystal structure | Absent | 1000 | 1000 | 19800 | 0.05 |
| Comparative example 2 | Hexagonal crystal structure | Absent | 1100 | 1100 | 19800 | 0.06 |
| Comparative example 3 | Hexagonal crystal structure | $WO_2$&W | 3200 | 2400 | 19800 | 0.12 |
| Comparative | Hexagonal | Absent | 1300 | 1300 | 19800 | 0.07 |

TABLE 2-continued example 4  crystal structure

|  | Peak position 2θ [°] | BET [m²/g] | x/y | Dispersed particle size in dispersion liquid [nm] | Crystallite size [nm] | Volatile component (%) |
|---|---|---|---|---|---|---|
| Example 1 | 27.8 | 60.0 | 0.29 | 70 | 16.9 | 1.6 |
| Example 2 | 27.8 | 51.6 | 0.29 | 80 | 19.5 | 1.5 |
| Example 3 | 27.8 | 41.6 | 0.29 | 80 | 21.1 | 1.4 |
| Example 4 | 27.8 | 54.8 | 0.29 | 80 | 18.7 | 1.6 |
| Example 5 | 27.8 | 57.8 | 0.29 | 70 | 17.9 | 1.6 |
| Example 6 | 27.8 | 37.8 | 0.30 | 80 | 28.2 | 1.3 |
| Example 7 | 27.8 | 44.7 | 0.29 | 80 | 23.0 | 1.4 |
| Example 8 | 27.8 | 38.3 | 0.30 | 80 | 29.0 | 1.3 |
| Example 9 | 27.9 | 62.5 | 0.32 | 70 | 17.2 | — |
| Example 10 | 27.9 | 64.2 | 0.27 | 70 | 17.5 | — |
| Example 11 | 27.9 | 62.3 | 0.19 | 80 | 18.5 | — |
| Example 12 | 28.1 | 60.8 | 0.14 | 70 | 17.3 | — |
| Example 13 | 28.0 | 62.3 | 0.39 | 80 | 18.0 | — |
| Example 14 | 27.8 | 1.2 | 0.33 | 80 | 23.9 | — |
| Example 15 | 23.9 | 110.3 | 0.30 | 70 | 16.1 | — |
| Example 16 | 23.4 | 90.3 | 0.10 | 70 | 16.9 | — |
| Example 17 | 23.1 | 71.3 | 0.27 | 70 | 17.5 | — |
| Example 18 | 24.2 | 62.9 | 0.01 | 70 | 17.8 | — |
| Example 19 | 23.5 | 61.0 | 0.10 | 70 | 17.5 | — |
| Example 20 | 23.6 | 60.5 | 0.08 | 70 | 17.8 | — |
| Example 21 | 24.0 | 59.8 | 0.02 | 80 | 18.0 | — |
| Example 22 | 23.6 | 58.5 | 0.19 | 80 | 18.2 | — |
| Example 23 | 23.1 | 57.1 | 0.19 | 80 | 18.4 | — |
| Example 24 | 23.5 | 61.3 | 0.04 | 70 | 17.7 | — |
| Example 25 | | | | The same as example 1 | | |
| Example 26 | 27.8 | 42.6 | 0.33 | 80 | 23.7 | 2.2 |
| Example 27 | 27.8 | 41.2 | 0.33 | 80 | 24.1 | 1.5 |
| Example 28 | 27.8 | 42.3 | 0.33 | 80 | 23.9 | 1.5 |
| Example 29 | 27.8 | 34.3 | 0.33 | 80 | 38.2 | 1.5 |
| Example 30 | 27.8 | 32.2 | 0.33 | 80 | 37.8 | 1.3 |
| Example 31 | 27.8 | 31.3 | 0.33 | 80 | 38.5 | 1.3 |
| Example 32 | 27.8 | 31.6 | 0.33 | 80 | 36.7 | 1.6 |
| Example 33 | 27.8 | 32.3 | 0.33 | 80 | 36.3 | 1.3 |
| Example 34 | 27.8 | 33.2 | 0.33 | 80 | 36.0 | 1.3 |
| Example 35 | 27.8 | 60.0 | 0.29 | 70 | 16.9 | 1.6 |
| Comparative example 1 | 27.8 | 90.2 | 0.29 | 80 | 8.0 | — |
| Comparative example 2 | 27.8 | 86.0 | 0.29 | 80 | 9.2 | — |
| Comparative example 3 | 27.8 | 43.0 | 0.29 | 80 | 22.9 | — |
| Comparative example 4 | 27.8 | 102.8 | 0.33 | 120 | 8.1 | 2.2 |

TABLE 3

|  | Substrate | Binder | Average particle size of fine particles in dispersion body (nm) | Optical properties of near-infrared shielding glass | | | |
|---|---|---|---|---|---|---|---|
|  |  |  |  | Visible light transmittance (%) | Solar radiation transmittance (%) | Haze value (%) | Blue haze |
| Example 1 | Glass (thickness 3 mm) | Ultraviolet curing resin | 17 | 70 | 36.5 | 0.4 | Absent |
| Example 2 | Glass (thickness 3 mm) | Ultraviolet curing resin | 19 | 70 | 36.4 | 0.4 | Absent |
| Example 3 | Glass (thickness 3 mm) | Ultraviolet curing resin | 21 | 70 | 36.4 | 0.4 | Absent |
| Example 4 | Glass (thickness 3 mm) | Ultraviolet curing resin | 19 | 70 | 36.5 | 0.4 | Absent |
| Example 5 | Glass (thickness 3 mm) | Ultraviolet curing resin | 18 | 70 | 36.0 | 0.4 | Absent |
| Example 6 | Glass (thickness 3 mm) | Ultraviolet curing resin | 28 | 70 | 35.9 | 0.4 | Absent |
| Example 7 | Glass (thickness 3 mm) | Ultraviolet curing resin | 22 | 70 | 36.1 | 0.4 | Absent |
| Example 8 | Glass (thickness 3 mm) | Ultraviolet curing resin | 29 | 70 | 36.2 | 0.4 | Absent |
| Example 9 | Glass (thickness 3 mm) | Ultraviolet curing resin | 17 | 70 | 39.3 | 0.4 | Absent |
| Example 10 | Glass (thickness 3 mm) | Ultraviolet curing resin | 17 | 70 | 43.8 | 0.4 | Absent |
| Example 11 | Glass (thickness 3 mm) | Ultraviolet curing resin | 18 | 70 | 42.8 | 0.4 | Absent |
| Example 12 | Glass (thickness 3 mm) | Ultraviolet curing resin | 17 | 70 | 42.9 | 0.4 | Absent |
| Example 13 | Glass (thickness 3 mm) | Ultraviolet curing resin | 18 | 70 | 40.2 | 0.4 | Absent |
| Example 14 | Glass (thickness 3 mm) | Ultraviolet curing resin | 23 | 70 | 35.6 | 0.3 | Absent |
| Example 15 | Glass (thickness 3 mm) | Ultraviolet curing resin | 16 | 70 | 43.2 | 0.4 | Absent |
| Example 16 | Glass (thickness 3 mm) | Ultraviolet curing resin | 17 | 70 | 44.3 | 0.4 | Absent |

TABLE 3-continued

| | Substrate | Binder | Average particle size of fine particles in dispersion body (nm) | Visible light transmittance (%) | Solar radiation transmittance (%) | Haze value (%) | Blue haze |
|---|---|---|---|---|---|---|---|
| Example 17 | Glass (thickness 3 mm) | Ultraviolet curing resin | 17 | 70 | 44.9 | 0.4 | Absent |
| Example 18 | Glass (thickness 3 mm) | Ultraviolet curing resin | 17 | 70 | 44.1 | 0.4 | Absent |
| Example 19 | Glass (thickness 3 mm) | Ultraviolet curing resin | 17 | 70 | 42.6 | 0.4 | Absent |
| Example 20 | Glass (thickness 3 mm) | Ultraviolet curing resin | 17 | 70 | 42.2 | 0.4 | Absent |
| Example 21 | Glass (thickness 3 mm) | Ultraviolet curing resin | 18 | 70 | 43.7 | 0.4 | Absent |
| Example 22 | Glass (thickness 3 mm) | Ultraviolet curing resin | 18 | 70 | 44.1 | 0.4 | Absent |
| Example 23 | Glass (thickness 3 mm) | Ultraviolet curing resin | 18 | 70 | 43.5 | 0.4 | Absent |
| Example 24 | Glass (thickness 3 mm) | Ultraviolet curing resin | 17 | 70 | 43.4 | 0.4 | Absent |
| Example 25 | | Sheet shape (described in Table 4) | | | | | |
| Example 26 | Glass (thickness 3 mm) | Ultraviolet curing resin | 23 | 70 | 35.7 | 0.3 | Absent |
| Example 27 | Glass (thickness 3 mm) | Ultraviolet curing resin | 24 | 70 | 35.6 | 0.3 | Absent |
| Example 28 | Glass (thickness 3 mm) | Ultraviolet curing resin | 23 | 70 | 35.7 | 0.3 | Absent |
| Example 29 | Glass (thickness 3 mm) | Ultraviolet curing retin | 38 | 70 | 36.1 | 0.3 | Absent |
| Example 30 | Glass (thickness 3 mm) | Ultraviolet curing resin | 37 | 70 | 36.0 | 0.3 | Absent |
| Example 31 | Glass (thickness 3 mm) | Ultraviolet curing resin | 38 | 70 | 36.3 | 0.3 | Absent |
| Example 32 | Glass (thickness 3 mm) | Ultraviolet curing resin | 36 | 70 | 36.2 | 0.3 | Absent |
| Example 33 | Glass (thickness 3 mm) | Ultraviolet curing resin | 32 | 70 | 36.5 | 0.3 | Absent |
| Example 34 | Glass (thickness 3 mm) | Ultraviolet curing resin | 36 | 70 | 36.4 | 0.3 | Absent |
| Example 35 | Glass (thickness 3 mm) | Ultraviolet curing resin | 16 | 70 | 36.9 | 0.6 | Absent |
| Comparative example 1 | Glass (thickness 3 mm) | Ultraviolet curing resin | 20 | 70 | 53.2 | 0.3 | Absent |
| Comparative example 2 | Glass (thickness 3 mm) | Ultraviolet curing resin | 23 | 70 | 52.1 | 0.3 | Absent |
| Comparative example 3 | Glass (thickness 3 mm) | Ultraviolet curing resin | 23 | 70 | 47.8 | 0.3 | Absent |
| Comparative example 4 | Glass (thickness 3 mm) | Ultraviolet curing resin | 120 | 70 | 48.3 | 1.8 | Present |

TABLE 4

Near-infrared shielding ultrafine particle dispersion body in the form of sheet

| | Binder | Visible light transmittance (%) | Solar radiation transmittance (%) | Haze value (%) | Content of composite tungsten oxide ultrafine particles (mass %) |
|---|---|---|---|---|---|
| Example 25 | Polycarbonate resin | 70 | 37.9 | 0.7 | 0.29 |
| Example 26 | Polycarbonate resin | 70 | 36.9 | 0.9 | 0.23 |
| Example 27 | Polycarbonate resin | 70 | 36.8 | 0.8 | 0.23 |
| Example 28 | Polycarbonate resin | 70 | 36.9 | 0.8 | 0.23 |
| Example 29 | Polycarbonate resin | 70 | 37.2 | 1.4 | 0.23 |
| Example 30 | Polycarbonate resin | 70 | 37.3 | 1.3 | 0.21 |
| Example 31 | Polycarbonate resin | 70 | 37.7 | 1.3 | 0.21 |
| Example 32 | Polycarbonate resin | 70 | 37.3 | 1.5 | 0.21 |
| Example 33 | Polycarbonate resin | 70 | 37.9 | 1.4 | 0.21 |
| Example 34 | Polycarbonate resin | 70 | 37.8 | 1.4 | 0.21 |

TABLE 5

| | | Fine particle in intermediate film | | Optical properties | | |
|---|---|---|---|---|---|---|
| | | Used fine particle | Particle size (nm) | Visible light transmittance (%) | Solar radiation transmittance (%) | Haze value (%) |
| Example 36 | Laminated structure A | Example 1 | 17 | 70 | 34.4 | 0.8 |
| Example 37 | Laminated structure B | | 17 | 73 | 38.8 | 1.0 |
| Example 38 | Laminated structure C | | 17 | 74 | 39.0 | 0.8 |
| Example 39 | Laminated structure C' | | 17 | 77 | 43.7 | 0.8 |
| Example 40 | Laminated structure D | Example 2 | 19 | 70 | 34.9 | 0.8 |
| Example 41 | Laminated structure E | Example 3 | 21 | 70 | 34.9 | 0.8 |
| Example 42 | Laminated structure F | Example 4 | 19 | 70 | 35.0 | 0.8 |

TABLE 5-continued

| | | Fine particle in intermediate film | Optical properties | | |
| | | | Particle size (nm) | Visible light transmittance (%) | Solar radiation transmittance (%) | Haze value (%) |
|---|---|---|---|---|---|---|
| | | Used fine particle | | | | |
| Example 43 | Laminated structure G | Example 5 | 18 | 70 | 34.6 | 0.8 |
| Example 44 | Laminated structure H | Example 6 | 28 | 70 | 34.4 | 0.8 |
| Example 45 | Laminated structure I | Example 7 | 22 | 70 | 34.3 | 0.8 |
| Example 46 | Laminated structure J | Example 8 | 29 | 70 | 34.9 | 0.8 |
| Example 47 | Laminated structure K | Example 9 | 17 | 70 | 37.8 | 0.8 |
| Example 48 | Laminated structure L | Example 10 | 17 | 70 | 42.0 | 0.9 |
| Example 49 | Laminated structure M | Example 11 | 18 | 70 | 41.3 | 0.9 |
| Example 50 | Laminated structure N | Example 12 | 17 | 70 | 41.4 | 0.9 |
| Example 51 | Laminated structure O | Example 13 | 18 | 70 | 38.8 | 0.9 |
| Example 52 | Laminated structure P | Example 14 | 23 | 70 | 34.0 | 0.8 |
| Example 53 | Laminated structure Q | Example 15 | 16 | 70 | 41.9 | 0.8 |
| Example 54 | Laminated structure R | Example 16 | 17 | 70 | 42.9 | 0.8 |
| Example 55 | Laminated structure S | Example 17 | 17 | 70 | 43.7 | 0.8 |
| Example 56 | Laminated structure T | Example 18 | 17 | 70 | 42.6 | 0.8 |
| Example 57 | Laminated structure U | Example 19 | 17 | 70 | 41.2 | 0.8 |
| Example 58 | Laminated structure V | Example 20 | 17 | 70 | 41.0 | 0.8 |
| Example 59 | Laminated structure W | Example 21 | 18 | 70 | 42.5 | 0.8 |
| Example 60 | Laminated structure X | Example 22 | 18 | 70 | 42.8 | 0.8 |
| Example 61 | Laminated structure Y | Example 23 | 18 | 70 | 42.0 | 0.8 |
| Example 62 | Laminated structure Z | Example 24 | 17 | 70 | 42.0 | 0.8 |
| Example 63 | Laminated structure a | Example 1 | 17 | 70 | 34.9 | 0.8 |
| Example 64 | Laminated structure b | Example 26 | 23 | 70 | 34.4 | 0.8 |
| Example 65 | Laminated structure c | Example 27 | 24 | 70 | 34.6 | 0.8 |
| Example 66 | Laminated structure d | Example 28 | 23 | 70 | 35.0 | 0.8 |
| Example 67 | Laminated structure e | Example 29 | 38 | 70 | 34.8 | 1.4 |
| Example 68 | Laminated structure f | Example 30 | 37 | 70 | 35.0 | 1.3 |
| Example 69 | Laminated structure g | Example 31 | 38 | 70 | 35.2 | 1.3 |
| Example 70 | Laminated structure h | Example 32 | 36 | 70 | 34.8 | 1.5 |
| Example 71 | Laminated structure i | Example 33 | 32 | 70 | 35.0 | 1.4 |
| Example 72 | Laminated structure j | Example 34 | 36 | 70 | 35.1 | 1.4 |
| Example 73 | Laminated structure k | Example 1 | 17 | 70 | 35.9 | 0.8 |
| Comparative example 5 | Laminated structure AA | Comparative example 1 | 21 | 70 | 53.0 | 0.8 |
| Comparative example 6 | Laminated structure AB | Comparative example 2 | 23 | 70 | 52.0 | 0.8 |
| Comparative example 7 | Laminated structure AC | Comparative example 3 | 23 | 70 | 48.0 | 0.8 |

DESCRIPTION OF SIGNS AND NUMERALS

1 Thermal plasma
2 High-frequency coil
3 Sheath gas feeding nozzle
4 Plasma gas feeding nozzle
5 Raw material powder feeding nozzle
6 Reaction vessel
7 Suction pipe
8 filter

The invention claimed is:

1. A near-infrared shielding ultrafine particle dispersion body in which ultrafine particles having near-infrared shielding properties are dispersed in a solid medium, wherein
the ultrafine particles are composite tungsten oxide ultrafine particles expressed by a general formula $M_xW_yO_z$, wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1, 2.0 \leq z/y \leq 3.0$,
a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference, and
a crystallite size of the composite tungsten oxide ultrafine particle is 10 nm or more and 200 nm or less.

2. The near-infrared shielding ultrafine particle dispersion body according to claim 1, wherein the composite tungsten oxide ultrafine particles contain a hexagonal crystal structure.

3. The near-infrared shielding ultrafine particle dispersion body according to claim 1, wherein a content of a volatile component in the composite tungsten oxide ultrafine particles is 2.5 mass % or less.

4. The near-infrared shielding ultrafine particle dispersion body according to claim 1, wherein the solid medium is a medium resin.

5. The near-infrared shielding ultrafine particle dispersion body according to claim 4, wherein the medium resin is a resin of one kind selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene vinyl acetate copolymer resin, and polyvinyl acetal resin, or a mixture of two or more resins selected from the above resin group, or a copolymer of two or more resins selected from the above resin group.

6. The near-infrared shielding ultrafine particle dispersion body according to claim 4, wherein the medium resin is a UV curable resin binder.

7. The near-infrared shielding ultrafine particle dispersion body according to claim 1, which contains 0.001 mass % or more and 80 mass % or less of the composite tungsten oxide ultrafine particles.

8. The near-infrared shielding ultrafine particle dispersion body according to claim 1, wherein the near infrared shielding ultrafine particle dispersion body is in a form of a sheet or a board or a film.

9. The near-infrared shielding ultrafine particle dispersion body according to claim 1, which is provided as a coating layer having a thickness of 1μm or more and 10 μm or less on a transparent substrate.

10. The near-infrared shielding ultrafine particle dispersion body according to claim 9, wherein the transparent substrate is a polyester film.

11. The near-infrared shielding ultrafine particle dispersion body according to claim 9, wherein the transparent substrate is a glass.

12. A solar radiation shielding intermediate film which constitutes an interlayer sandwiched between two or more transparent substrates in an infrared shielding lamination structure, in which the near-infrared shielding ultrafine particle dispersion body of claim 1 is used.

13. An infrared shielding laminated structure comprising two or more transparent substrates and an interlayer sandwiched between the two or more transparent substrates, wherein the interlayer is composed of one or more intermediate films, at least one layer of the intermediate films is a solar radiation shielding intermediate film of claim 12, and the transparent substrate is any one selected from a sheet glass, a plastic, and a plastic containing fine particles having a solar radiation shielding function.

* * * * *